United States Patent
Cui et al.

(10) Patent No.: US 8,325,349 B2
(45) Date of Patent: Dec. 4, 2012

(54) FOCAL PLANE ADJUSTMENT BY BACK PROPAGATION IN OPTOFLUIDIC MICROSCOPE DEVICES

(75) Inventors: Xiquan Cui, Pasadena, CA (US); Lap Man Lee, Arcadia, CA (US); Changhuei Yang, Pasadena, CA (US)

(73) Assignee: California Institute of Technology, Pasadena, CA (US)

( * ) Notice: Subject to any disclaimer, the term of this patent is extended or adjusted under 35 U.S.C. 154(b) by 331 days.

(21) Appl. No.: 12/638,518

(22) Filed: Dec. 15, 2009

(65) Prior Publication Data
US 2011/0170105 A1    Jul. 14, 2011

Related U.S. Application Data

(63) Continuation-in-part of application No. 12/398,050, filed on Mar. 4, 2009.

(60) Provisional application No. 61/068,131, filed on Mar. 4, 2008, provisional application No. 61/201,890, filed on Dec. 16, 2008.

(51) Int. Cl.
*G01N 9/02* (2006.01)

(52) U.S. Cl. ........................ 356/515; 356/521

(58) Field of Classification Search ............... 250/201.9, 250/208.1, 216, 226; 356/512–516, 521
See application file for complete search history.

(56) References Cited

U.S. PATENT DOCUMENTS

| | | | |
|---|---|---|---|
| 4,438,330 A | 3/1984 | Hardy | |
| 4,692,027 A | 9/1987 | MacGovern et al. | |
| 4,737,621 A | 4/1988 | Gonsiorowski | |
| 4,980,716 A | 12/1990 | Suzuki et al. | |
| 4,981,362 A | 1/1991 | deJong et al. | |
| 5,196,350 A | 3/1993 | Backman et al. | |
| 5,233,174 A | 8/1993 | Zmek | |
| 5,362,653 A | 11/1994 | Carr et al. | |
| 5,426,505 A | 6/1995 | Geiser et al. | |
| 5,795,755 A | 8/1998 | Lemelson | |
| 5,798,262 A | 8/1998 | Garini et al. | |

(Continued)

FOREIGN PATENT DOCUMENTS

EP    1371965    12/2003
(Continued)

OTHER PUBLICATIONS

Adams, Mark L.,et al., "Microfluidic Integration on detector arrays for absorption and flourescence micro-spectrometers," Sensors and Actuators A, vol. 104, pp. 25-31 (2003).

(Continued)

*Primary Examiner* — Hwa Lee
(74) *Attorney, Agent, or Firm* — Weaver Austin Villeneuve & Sampson LLP; Sheila Martinez-Lemke

(57) ABSTRACT

Embodiments of the present invention relate to techniques for improving optofluidic microscope (OFM) devices. One technique that may be used employs surface tension at a hydrophobic surface to passively pump the fluid sample through the fluid channel. Another technique uses electrodes to adjust the position of objects in the fluid channel. Another technique computationally adjusts the focal plane of an image wavefront measured using differential interference contrast (DIC) based on Young's interference by back propagating the image wavefront from the detection focal plane to a different focal plane. These techniques can be employed separately or in combination to improve the capabilities of OFM devices.

17 Claims, 24 Drawing Sheets

U.S. PATENT DOCUMENTS

| | | | |
|---|---|---|---|
| 5,973,316 | A | 10/1999 | Ebbeson et al. |
| 6,143,247 | A | 11/2000 | Sheppard, Jr. et al. |
| 6,499,499 | B2 | 12/2002 | Dantsker et al. |
| 6,753,131 | B1 | 6/2004 | Rogers et al. |
| 6,858,436 | B2 | 2/2005 | Zenhausern et al. |
| 6,987,255 | B2 | 1/2006 | Smith |
| 7,045,781 | B2 | 5/2006 | Adamec et al. |
| 7,113,268 | B2 | 9/2006 | Gerwe et al. |
| 7,271,885 | B2 | 9/2007 | Schermer |
| 7,283,229 | B2 | 10/2007 | Noguchi et al. |
| 7,399,445 | B2 | 7/2008 | Kuroda et al. |
| 7,641,856 | B2 | 1/2010 | Padmanabhan et al. |
| 7,671,987 | B2 | 3/2010 | Padmanabhan et al. |
| 7,738,695 | B2 * | 6/2010 | Shorte et al. ............ 382/154 |
| 7,751,048 | B2 | 7/2010 | Yang et al. |
| 7,768,654 | B2 | 8/2010 | Cui et al. |
| 7,773,227 | B2 | 8/2010 | Yang et al. |
| 7,864,333 | B1 | 1/2011 | Olczak et al. |
| 2003/0142291 | A1 | 7/2003 | Padmanabhan et al. |
| 2003/0174992 | A1 | 9/2003 | Levene et al. |
| 2003/0203502 | A1 | 10/2003 | Zenhausern et al. |
| 2004/0156610 | A1 | 8/2004 | Charlton et al. |
| 2004/0175734 | A1 | 9/2004 | Stahler et al. |
| 2004/0190116 | A1 | 9/2004 | Lezec et al. |
| 2004/0224380 | A1 | 11/2004 | Chou et al. |
| 2005/0271548 | A1 | 12/2005 | Yang et al. |
| 2006/0003145 | A1 | 1/2006 | Hansen et al. |
| 2006/0013031 | A1 | 1/2006 | Ravkin et al. |
| 2006/0175528 | A1 | 8/2006 | Greenway et al. |
| 2007/0172745 | A1 | 7/2007 | Smith |
| 2007/0207061 | A1 | 9/2007 | Yang et al. |
| 2007/0258096 | A1 | 11/2007 | Cui et al. |
| 2009/0225319 | A1 | 9/2009 | Lee et al. |
| 2009/0276188 | A1 | 11/2009 | Cui et al. |
| 2010/0195873 | A1 | 8/2010 | Cui et al. |
| 2010/0309457 | A1 | 12/2010 | Cui et al. |
| 2011/0063623 | A1 | 3/2011 | Cui et al. |
| 2011/0181884 | A1 | 7/2011 | Cui et al. |
| 2012/0061554 | A1 | 3/2012 | Cui et al. |

FOREIGN PATENT DOCUMENTS

| | | |
|---|---|---|
| JP | 2003-207454 | 7/2003 |
| JP | 2003524779 | 8/2003 |
| WO | WO0210713 | 2/2002 |
| WO | WO2004038484 | 5/2004 |

OTHER PUBLICATIONS

Beebe, David J., et al., "Physics and Applications of Microfluidics in Biology," Annu. Rev. Biomed., Eng., vol. 4, pp. 261-286 (2002).

Bethe, H.A., "Theory of Diffraction by Small Holes," The Physical Review, vol. 66, Nos. 7-8, pp. 163-182 (1944).

Biddiss, Elaine, et al., "Hetergeneous Surface Charge Enhanced Micromixing for Electrokinetic Flows," Anal. Chem., vol. 76, pp. 3208-3213 (2004).

Boppart, S. A., et al., "Forward-imaging instruments for optical coherence tomography," Optics Letters, vol. 22, pp. 1618-1620 (1997).

Cao, Jinhua, et al., "Brownian Particle Distribution in Tube Flows," Proceedings of IMECE04, vol. 260, pp. 243-252 (2004).

Cheng, Ya, et al., "Microfluidic laser embedded in glass by three-dimensional femtosecond laser microprocessing," Optics Letters, vol. 29, No. 17, pp. 2007-2009 (2004).

Chovin, Arnaud, et al., "Fabrication, Characterization, and Far-Field Optical Properties of an Ordered Array of Nanoapertures," Nano Letters, vol. 4, No. 10, pp. 1965-1968 (2004).

Chronis, Nikolas, et al., "Total internal reflection-based biochip utilizing a polymer-filled cavity with a micromirror sidewall," Lab Chip, vol. 4, pp. 125-130 (2004).

Courjon, Daniel, "Near-field Microscopy and near-field optics," Imperial College Press, 317 pages (2003).

Creath, K., "Phase-Measurement interferometry techniques," Prog. Opt., vol. 26, p. 44 (1988).

Cui, Xiquan, et al., "Lensless high-resolution on-chip optofluidic microscopes for Caenorhabditis elegans and cell imaging," Proceedings of the National Academy of Science, vol. 105, p. 10670 (2008).

Cui, Xiquan, et al., "Portable optical microscope-on-a-chip," Photonics West, San Jose, CA (Jan. 2006).

Cui, Xiquan, et al., "Quantitative differential interference contrast microscopy based on structured-aperture interference," Applied Physics Letters, vol. 93, pp. 091113-1-091113-3 (2008).

Cui, Xiquan, et al., "Slanted hole array beam profiler (SHArP)—a high-resolution portable beam profiler based on a linear aperture array," Optics Letters, vol. 31, No. 21, pp. 3161-3163 (2006).

Dahan, M., et al., "Time-gated biological imaging by use of collidal quantum dots," Optics Letters, vol. 26, No. 11, pp. 825-827 (2001).

De Fornel, F., "Evanescent waves from Newtonian optics and Atomic optics," Springer, 270 pages (2001).

Garcia De Abajo, F. J.,"Light transmission through a single cylindrical hole in a metallic film," Optics Letters, vol. 10, No. 25, pp. 1475-1484 (2002).

Heng, Xin, et al., "Optofluidic Microscope, a miniature microscope on a chip," 9th International Converence on Miniaturized Systems for Chemistry and Life Sciences (μTAS) (2005).

Heng, Xin, et al., "Optofluidic Microscopy," Proceedings of the ICMM 2005 3rd International Conference on Microchannels and Minichannels, pp. 1-6 (2005).

Heng, Xin, et al., "Optofluidic Microscopy—a method for implementing a high resolution optical microscope on a chip," Lab Chip, vol. 6, pp. 1274-1276 (2006).

Heng, Xin, et al., "An Optical Tweezer Actuated, Nanoaperture-grid based Optofluidic Microscope Implimentation Method," Optics Express, vol. 15, No. 25, 16367-75 (2007).

Jaiswal, Jyoti K., et al., "Long-term multiple color imaging of live cells using quantum dot biconjugates," Nature Biotechnology, vol. 21, pp. 47-51 (2003).

Lay, Christophe, et al., "Enhanced microfiltration devices configured with hydrodynamic trapping and a rain drop bypass filtering architecture for microbial cells detection," Lab Chip 2008, 8:830-833; published as Advanced Article on Apr. 1, 2008 at http://pubs.rsc.org | DOI:10.1039/b800015h.

Lee, Lap Man, et al., "The Application of On-Chip Optofluidic Microscopy for Imaging Giardia lamblia Trophozoites and Cysts," Biomed Microdevices, Springer DOI 10.1007/s10544-009-9312-x (2009).

Lew, Matthew et al., "Interference of a four-hole aperture for on-chip quantitative two-dimensional differential phase imaging," Optic Letters, vol. 32, No. 20, pp. 2963-2965 (Oct. 2007).

Nott, Prabhu R., et al., "Pressure-driven flow of suspensions: simulation and theory," 1994, J. Fluid Mech., vol. 275, pp. 157-199.

Nozokido, Tatsuo, et al., "Scanning Near-Field Millimeter-Wave Microscopy Using a Metal Slit as a Scanning Probe," IEEE Transactions on Microwave Theory and Techniques, vol. 49, No. 3, 491-99 (2001).

Probstein, R. F., "Physicochemical Hydrodynamics," Wiley, 2nd Edition pp. 109-116, 123, 190-197, and 309-310 (2003).

Psaltis, Demetri, et al., "Developing optofluidic technology through the fusion of microfluidics and optics," Nature, vol. 442 (2006).

Segre, G., et al., "Behavior of macroscopic rigid spheres in Poiseuille flow: Part 1. Determination of local concentration by statistical analysis of particle passages through crossed light beams," J. Fluid Mech., vol. 14, pp. 115-135 (1962).

Segre, G., et al., "Behavior of macroscopic rigid spheres in Poiseuille flow: Part 2. Experimental results and interpretation," J. Fluid Mech., vol. 14, pp. 136-157 (1962).

Seo, Jeonggi, et al., "Disposable integrated microfluidics with self-aligned planar microlenses," Sensors and Acutators B, vol. 99, pp. 615-622 (2004).

Spring, Kenneth R., et al., "Introduction to Fluorescence Microscopy," <http://www.microscopyu.com/articles/fluorescence/fluorescenceintro.html> (Aug. 25, 2004).

Stone, H.A., et al., "Engineering Flows in Small Devices: Microfluidics Toward a Lab-on-a-Chip," Annu. Rev. Fluid Mech., vol. 36, pp. 381-411 (2004).

Tearney, G. J., et al., "Scanning single-mode fiber optic catheter-endoscope for optical coherence tomography," Optics Letters, vol. 21, pp. 543-545 (1996).

Thorsen, Todd, et al., "Microfluidic Large-Scale Integration," Science, vol. 298, pp. 580-584 (2002).

Walker, Glenn, and Beebe, David, "A Passive Pumping Method for Microfluidic Devices," Lab Chip, pp. 131-134 (2002).
Zhu, Liang, et all., "Filter-based microfluidic device as a platform for immunofluorescent assay of microbial cells," Lab Chip, 2004, vol. 4, pp. 337-341; published as Advanced Article on Apr. 5, 2004 at http://pubs.rsc.org | DOI: 10.1039/b401834f.
Albensi, "Elements of Scientific Visualization in Basic Neuroscience Research," BioScience, 54:1127-1137 (2004).
Arun, Anand et al., "Wavefront sensing with random amplitude mask and phase retrieval," Optics Letters 32(11) (Jun. 1, 2007).
Arnison, M.R., "Linear phase imaging using differential interference contrast microscopy," Journal of Microscopy, 214(1):7-12 (Apr. 2004).
Barty, A., et all, "Quantitative optical phase microscopy," Optics Letters, vol. 23, pp. 817-819 (1998).
Betzig, E., et al., "Imaging intracellular fluorescent proteins at nanometer resolution," Science, vol. 313, pp. 1642-1645 (2006).
Booth, M. et al., "Adaptive aberration correction in a confocal microscope," Proceedings of the National Academy of Sciences of the United States of America, vol. 99, pp. 5788-5792 (2002).
Bouwkamp, C.J., "Diffraction Theory," Reports on Progress on Physics XVIII, pp. 35-100 (1954).
Carmon, Y., and Ribak, E.N., "Phase retrieval by demodulation of a Hartmann-Shack sensor," Opt. Commun., vol. 215, pp. 285-288 (2003).
Chalut, K.J., et al., "Quantitative phase microscopy with asynchronous digital holography," Optics Express, vol. 15, pp. 3047-3052 (2007).
Choi, W., et al., "Tomographic phase microscopy," Nature Methods, vol. 4, No. 9, pp. 717-719 (Sep. 2007).
Cogswell, C. et al., "Confocal differential interference contrast (DIC) microscopy: including a theoretical analysis of conventional and confocal DIC imaging," Journal of Microscopy, vol. 165. pp. 81-101 (Jan. 1992).
Dunn, et al., "Introduction to Confocal Microscopy," available from MicroscopyU at http://www.microscopyu.com/articles/confocal (2007).
Ebbesen, T. W., et al., "Extraordinary optical transmission through sub-wavelength hole arrays," Nature, vol. 391, No. 6668, pp. 667-669 (Feb. 1998).
Fu, Anne Y., et al., "A microfabricated fluorescence-activated cell sorter," Nature Biotechnology, vol. 17, No. 11, pp. 1109-1111 (Nov. 1999).
Haglund, M. M., et al., "Enhanced optical imaging of human gliomas and tumor margins," Neurosurgery, vol. 38, pp. 308-317 (1996).
Heng, Xin, et al., "Characterization of light collection through a subwavelength aperture from a point source," Optics Express, vol. 14, pp. 10410-10425 (2006).
Hoffman, R., and Gross, L., "The modulation contrast microscope," Nature, vol. 254, pp. 586-588 (1975).
Hogenboom, C. A., et al., "Three-dimensional images generated by quadrature interferometry," Optics Letters, vol. 23, pp. 783-785 (1998).
Ikeda, T., et al., "Hilbert phase microscopy for investigating fast dynamics in transparent systems," Optics Letters, vol. 30, pp. 1165-1167 (2005).
Kagalwala, Farhana, and Kanade, Takeo, "Reconstructing Specimens Using DIC Microscope Images," IEEE Transactions on Systems, Man, and Cybernetics-Part B: Cybernetics, vol. 33, No. 5 (Oct. 2003).
Lew, M. et al, "Interference of a four-hole aperture for on-chip quantitative two-dimensional differential phase imaging," Optics Letters, vol. 32, No. 20, Oct. 15, 2007, pp. 2963-2965.
Liu, Shaorong R., "A microfabricated hybrid device for DNA sequencing," Electrophoresis 2003, vol. 24, No. 21, pp. 3755-3761 (2003).
Liang, J., et al., "Supernormal vision and high-resolution retinal imaging through adaptive optics," J Opt. Soc. Am. A, vol. 14, No. 11, pp. 2884-2892 (Nov. 1997).
Marquet P. et al., "Digital holographic microscopy: a noninvasive contrast imaging technique allowing quantitative visualization of living cells with subwavelength axial accuracy," Optics Letters, vol. 30, No. 5, pp. 468-470 (2005).

Murphy, et al., "Differential Interference Contrast (DIC)," available from Nikon MicrocopyU at http://www.microscopyu.com/articles/dic/dicindex.html (2007).
Popescu, G., et al., "Optical measurement of cell membrane tension," Physical Review Letters 97 (2006).
Popescu, G., et al., "Diffraction phase microscopy for quantifying cell structure and dynamics," Optics Letters, vol. 31, No. 6 pp. 775-778 (2006).
Preza, Chrysanthe, "Rotational-Diversity Phase Estimation from Differential-Interference Contrast Microscopy Images," J. Opt. Soc. Am. A, vol. 17, No. 3 (Mar. 2000).
Rappaz, B. et al. "Measurement of the integral refractive index and dynamic cell morphometry of living cells with digital holographic microscopy," Optics Express, vol. 13, pp. 9361-9373 (2005).
Rueckel, M., et al., "Adaptive wavefront correction in two-photon microscopy using coherence-gated wavefront sensing," Proceedings of the National Academy of Sciences of the USA, vol. 103, pp. 17137-17142 (2006).
Rust, M. J., et al., "Sub-diffraction-limit imaging by stochastic optical reconstruction microscopy (STORM)," Nature Methods, vol. 3, pp. 793-795 (2006).
Sarunic, V., et al., "Full-field swept-source phase microscopy," Optics Letters, vol. 31, pp. 1462-1464 (2006).
Schwiegerling, J. et al., "Historical development of the Shack-Hartmann wavefront sensor," Robert Shannon and Roland Shack Legends in Applied Optics, SPIE—International Society for Optical Engineering, six pages (2005).
Sommer, R.J, and Sternberg, P.W., "Changes of induction and competence during the evolution of vulva development in nematodes," Science 265, pp. 114-118 (1994).
Stanley, S.L., "Amoebiasis," Lancet 361, pp. 1025-1034 (2003).
Tegenfeldt, Jonas O., et al., "Micro- and nanofluidics for DNA analysis," Analytical and Bioanalytical Chemistry, vol. 378, No. 7, pp. 1678-1692 (2004).
Tegenfeldt, Jonas O., et al., "Near-field Scanner for Moving Molecules," Physical review letters, vol. 86, No. 7, pp. 1378-1381 (Feb. 2001).
Thompson, R., et al., "Precise nanometer localization analysis for individual fluorescent probes," Biophysical Journal, 82(5), pp. 2775-2783 (May 2002).
Tokeshi, M. et al., "Chemical processing on microchips for analysis, synthesis, and bioassay," Electrophoresis, 24 (21, pp. 3583-3594 (2003).
Trau, D. et al., "Genotyping on a complementary metal oxide semiconductor silicon polymerase chain reaction chip with integrated DNA microarray," Analytical Chemistry, vol. 74, No. 13, pp. 3168-3173 (2002).
Wu, J. G., et al., "Full field phase imaging using a harmonically matched diffraction grating pair based homodyne quadrature interferometer," Applied Physics Letters, vol. 90, p. 3 (2007).
Yaqoob, Z., "Harmonically-related diffraction gratings-based interferometer for quadrature phase measurements," Optics Express, vol. 14, pp. 8127-8137 (2006).
Zernike, R., "Phase contrast, a new method for the microscopic observation of transparent objects," Physics 9, pp. 686-698 (1942).
Davidson, M., et al., "Differential interference contrast, 'Comparison of wavelength of DIC microscopy'," Florida State University website, last website modification Jul. 26, 2005, printed Apr. 13, 2009, 12 pages.
Doyle, P. S., et al., "Self-assembled magnetic matrices for DNA separation chips," Science, vol. 295, No. 5563, p. 2237 (Mar. 2002).
Drezet, A., et al., "Miniature Plasmonic Wave Plates," Physical Review Letters, vol. 101, pp. 43902-1-043902-4 (Jul. 25, 2008).
Fletcher, R., and Reeves, C.M., "Function minimization by conjugate gradients," Comput. J. 7, pp. 149-154 (1964).
Fowles, G. R., Introduction to Modern Optics, Dover Publications, Second Ed., pp. 57-61 (1989).
Kraus, J. D. and Fleisch, D. A., Electromagnetics with Applications (5th Ed), Chapter Section 4-16 (1999).
Lezec, H.J., et al. "Beaming Light from a Subwavelength Aperture," Science, vol. 297, No. 5582, pp. 820-822 (2002).

Lezec, H.J., and Thio, T., "Diffracted evanescent wave model for enhanced and suppressed optical transmission through subwavelength hole arrays," Optics Express, vol. 12, No. 16, pp. 3629-3651 (Aug. 2004).

Mehta, S. B., et al., "Quantitative phase-gradient imaging at high resolution with asymmetric illumination-based differential phase contrast," Optics Letters, vol. 34, pp. 1924-1926 (2009).

Platt, B. C. and Shack, R., History and Principles of Shack-Hartmann Wavefront Sensing, Journal of Refractive Surgery 17, pp. S573-S577 (Sep./Oct. 2001).

Schouten, H., et al., "Plasmon-assisted two-slit transmission: Young's experiment revisited," Physical Review Letters, vol. 94, pp. 053901-1-053901-4 (2005).

Shi, X., et al., "Ultrahigh light transmission through a C-shaped nanoaperture," Optics letters, vol. 28, pp. 1320-1322 (2003).

Ung, B., and Sheng, Y., "Optical surface waves over metallo-dielectric nanostructures: Sommerfeld integrals revisited," Optics Express, vol. 16, pp. 9073-9086 (2008).

International Search Report in International Application No. PCT/US2009/036045 (Apr. 23, 2009).

Written Opinion in International Application No. PCT/US2009/036045 (Apr. 23, 2009).

International Search Report in International Application No. PCT/2009/036052 (Jun. 29, 2009).

Written Opinion in International Application No. PCT/2009/036052 (Jun. 29, 2009).

Written Opinion in International Application No. PCT/US2005/016876 (Oct. 16, 2006).

International Search Report in International Application No. No. PCT/US2008/054908 (Aug. 26, 2008).

Written Opinion in International Application No. No. PCT/US2008/054908 (Aug. 26, 2008).

International Search Report in International Application No. PCT/US2010/021561 (Jun. 29, 2010).

Written Opinion in International Application No. PCT/US2010/021561 (Jun. 29, 2010).

International Search Report in International Application No. PCT/US2010/037235 (Dec. 20, 2010).

Written Opinion in International Application No. PCT/US2010/037235 (Dec. 20, 2010).

European Patent Office (EPO) Office Action in EPO Application No. 05749488.2 (Jan. 26, 2012).

European Patent Office (EPO) Office Action in EPO Patent Application No. 08730664.3 (Feb. 7, 2012).

Japanese Patent Office (JPO) Office Action in JPO patent Application No. 2007-515164 (Jul. 26, 2011).

Japanese Patent Office (JPO) Office Action in JPO patent Application No. 2007-515164 (May 8, 2012).

Japanese Patent Office (JPO) Office Action in JPO patent Application No. 2009-553675 (Jan. 24, 2012).

United States Patent and Trademark Office (USPTO) Office Action in U.S. Appl. No. 12/797,132 (Oct. 15, 2010).

United States Patent and Trademark Office (USPTO) Office Action in U.S. Appl. No. 12/785,635 (Oct. 15, 2010).

United States Patent and Trademark Office (USPTO) Office Action in U.S. Appl. No. 11/743,581 (May 22, 2009).

United States Patent and Trademark Office (USPTO) Office Action in U.S. Appl. No. 11/743,581 (Dec. 3, 2009).

United States Patent and Trademark Office (USPTO) Notice of Allowance in U.S. Appl. No. 11/743,581 (Mar. 26, 2010).

United States Patent and Trademark Office (USPTO) Office Action in U.S. Appl. No. 11/686,095 (Jan. 10, 2008).

United States Patent and Trademark Office (USPTO) Office Action in U.S. Appl. No. 11/686,095 (Jul. 17, 2008).

United States Patent and Trademark Office (USPTO) Office Action in U.S. Appl. No. 11/686,095 (Feb. 26, 2009).

United States Patent and Trademark Office (USPTO) Office Action in U.S. Appl. No. 11/686,095 (Oct. 28, 2009).

United States Patent and Trademark Office (USPTO) Notice of Allowance in U.S. Appl. No. 11/686,095 (Feb. 25, 2010).

United States Patent and Trademark Office (USPTO) Office Action in U.S. Appl. No. 11/125,718 (Jul. 1, 2009).

United States Patent and Trademark Office (USPTO) Office Action in U.S. Appl. No. 11/125,718 (Nov.14, 2008).

United States Patent and Trademark Office (USPTO) Office Action in U.S. Appl. No. 12/398,098 (May 23, 2011).

United States Patent and Trademark Office (USPTO) Notice of Allowance in U.S. Appl. No. 12/792,059 (Mar. 14, 2012).

United States Patent and Trademark Office (USPTO) Office Action in U.S. Appl. No. 13/157,245 (Dec. 6, 2011).

United States Patent and Trademark Office (USPTO) Office Action in U.S. Appl. No. 12/398,050 (Nov. 14, 2011).

United States Patent and Trademark Office (USPTO) Office Action in U.S. Appl. No. 12/398,098 (May 25, 2011).

United States Patent and Trademark Office (USPTO) Notice to File Corrected Application Papers in U.S. Appl. No. 12/435,165 (Jul. 25, 2011).

United States Patent and Trademark Office (USPTO) Notice of Allowance in U.S. Appl. No. 12/435,165 (Jun. 10, 2011).

United States Patent and Trademark Office (USPTO) Office Action in U.S. Appl. No. 12/435,165 (Apr. 12, 2011).

United States Patent and Trademark Office (USPTO) Office Action in U.S. Appl. No. 13/229,741 (Apr. 12, 2012).

United States Patent and Trademark Office (USPTO) Office Action in U.S. Appl. No. 12/792,177 (Dec. 23, 2011).

* cited by examiner

US 8,325,349 B2

FOCAL PLANE ADJUSTMENT BY BACK PROPAGATION IN OPTOFLUIDIC MICROSCOPE DEVICES

CROSS-REFERENCES TO RELATED APPLICATIONS

This application is a continuation-in-part application of the U.S. patent application Ser. No. 12/398,050 entitled "Optofluidic Microscope Device with Photosensor Array," filed on Mar. 4, 2009, which is a non-provisional application of and claims priority to U.S. Provisional Patent Application No. 61/068,131 entitled "Optofluidic Microscope" filed on Mar. 4, 2008. This application is also a non-provisional patent application that claims the benefit of the filing date of U.S. Provisional Patent Application No. 61/201,890 entitled "Further Improvements on Optofluidic Microscope" filed on Dec. 16, 2008. All of these applications are hereby incorporated by reference in their entirety for all purposes.

This non-provisional application is related to the following co-pending and commonly-assigned patent applications, which are hereby incorporated by reference in their entirety for all purposes:

U.S. patent application Ser. No. 11/125,718 entitled "Optofluidic Microscope Device" filed on May 9, 2005.

U.S. patent application Ser. No. 11/686,095 entitled "Optofluidic Microscope Device" filed on Mar. 14, 2007.

U.S. patent application Ser. No. 11/743,581 entitled "On-chip Microscope/Beam Profiler based on Differential Interference Contrast and/or Surface Plasmon Assisted Interference" filed on May 2, 2007.

U.S. patent application Ser. No. 12/398,098 entitled "Methods of Using Optofluidic Microscope Devices" filed Mar. 4, 2009.

U.S. patent application Ser. No. 12/435,165 entitled "Quantitative Differential Interference Contrast (DIC) Microscopy and Photography based on Wavefront Sensors" filed May 4, 2009.

STATEMENT AS TO RIGHTS TO INVENTIONS MADE UNDER FEDERALLY SPONSORED RESEARCH OR DEVELOPMENT

The U.S. Government has certain rights in this invention pursuant to Grant No. EB005666 awarded by the National Institutes of Health and Grant No. HR0011-04-1-0032 awarded by DARPA.

BACKGROUND OF THE INVENTION

Embodiments of the present invention generally relate to optofluidic microscope devices. More specifically, certain embodiments relate to techniques for improving optofluidic microscope (OFM) devices.

Microscopes and other optical microscopy devices are used extensively in all aspects of modern biomedicine and bioscience. Typically, conventional microscopes include an objective lens, a platform for supporting an object, and an eyepiece containing lenses for focusing images. These conventional microscope designs have bulky optics, and have proven to be expensive and difficult to miniaturize.

Some advances in optical microscopy promise to provide more compact systems but have presented significant technical barriers. For example, near field scanning optical microscopes (NSOMs) use a strongly enhanced and tightly confined optical field (near field) at the end of an NSOM probe tip to optically probe a specific location on an object. NSOMs can optically resolve structures with spatial resolutions of ~50 nm. In addition, NSOM imaging methods are non-destructive and can be used to image objects that are immersed in buffer media. NSOMs are however restricted to detecting light in the near field. Moreover, NSOMs have difficulty performing imaging at high throughput rates (i.e., high numbers of objects being imaged per unit time).

Some microscopy systems have eliminated lenses altogether. FIG. 1(a) is a schematic drawing of a top view of a lensless microscopy system. In this system, an object 10 being imaged is placed directly onto a light detector 11 (e.g., a complementary-symmetry metal-oxide-semiconductor (CMOS) light detector) having a two dimensional array of light detecting elements. The light detector 11 takes a snapshot image 32 of the object 10. The resolution of the snapshot image 102 is generally limited by the size of each light detecting element (e.g., pixel size).

FIG. 1(b) is a schematic drawing of a top view of another lensless microscopy system. The light detector 11 in this system is covered by an aperture layer 14 (e.g., a thin metal layer) with small apertures (holes). The apertures are formed in the aperture layer 14 at locations corresponding to the center of each discrete light detecting element in the light detector. Each light detecting element is generally only sensitive to light transmitted through the aperture above it. Since the apertures are small and relatively widely spaced at a pixel width apart, the light being transmitted through the apertures is a sparse sampling of the light being transmitted through to the aperture layer 14. By placing an object 10 above the aperture layer 14, a sparsely sampled image 34 of the object 10 can be generated. The sparsely sample image 34 may have a better resolution than images generated by the system shown in FIG. 1(a). The resolution of the image is however limited by the pixel size of the light detecting elements of the light detector 11.

FIG. 1(c) is a schematic drawing of a top view of the system of FIG. 1(b) where raster-scanning is employed to take time varying data to generate a filled-in image 36. The filled-in image 36 can be generated by raster-scanning the object 10 over the aperture layer 14 (or raster-scanning the aperture layer 14 over the object 10) and compositing the time varying transmissions of light through the apertures detected by the light detecting elements through the apertures. Since time varying data is used, the resolution of the filled-in image 36 is improved in the x-direction. However, the resolution is limited in the y-direction by the size of each light detecting element (e.g., pixel size).

BRIEF SUMMARY OF THE INVENTION

Embodiments of the present invention relate to techniques improving OFM devices. One technique which may be used eliminates the aperture layer covering the light detector layer. Other techniques retain the aperture layer, reversing the relative position of the light source and light detector such that light passes through the aperture layer before passing through the fluid channel to the light detector. Another technique adds an optical fiber bundle to relay light from light transmissive regions (such as apertures) to a remote light detector. This technique allows the light detector to be isolated from the light transmissive regions.

Additional techniques can be used to control the fluid flow and/or objects through the fluid channel. One technique that can be used adds one or more electrodes outside a surface of the fluid channel to attract objects to the surface. Another technique adds two electrodes at ends of the fluid channel to generate an electrical field capable of moving objects through the fluid channel while suppressing rotation. Another technique adds an injection unit for introducing objects into the fluid channel and two focusing units that use fluid flow to appropriately position objects in the fluid channel. Another technique adds a laser (optical tweezer) for controlling the movement of objects moving through the fluid channel. Another technique uses surface tension at a hydrophobic surface to passively pump the fluid sample from an inlet to an outlet of the fluid channel. Another technique uses electrodes to adjust the position of objects in the fluid channel. For example, a first electrode along a first surface and two electrodes along lateral surfaces can move objects toward the middle portion of the fluid channel and closer to the first surface.

Other techniques add filters and/or use fluorescence to improve the capabilities of OFM devices. Another technique computationally adjusts the focal plane of an image wavefront measured using differential interference contrast based on Young's interference by back propagating the image wavefront from the detection focal plane to a different focal plane. All of the techniques discussed by this application can be employed separately or in combination to improve the capabilities of OFM devices.

One embodiment is directed to an OFM device comprising a body defining a fluid channel having a longitudinal axis. The body includes a surface layer proximal to the fluid channel. The OFM device also comprises a one-dimensional array of light detecting elements located within the surface layer. The light detecting elements are configured to receive light passing through the fluid channel and generate time-varying data associated with the received light as an object passes through the fluid channel. The one-dimensional array of light detecting elements extends substantially from a first lateral side to a second lateral side of the fluid channel.

Another embodiment is directed to a method comprising causing an object to move through a fluid channel and providing light to the fluid channel using an illumination source while the object is moving through the fluid channel. The method also comprises receiving light from the illumination source passing through the fluid channel with an array of light detecting elements located in a surface layer of a body of the OFM device. The surface layer is proximal to the fluid channel. The one-dimensional array of light detecting elements extends substantially from a first lateral side to a second lateral side of the fluid channel. The method also comprises generating data associated with the received light by the array of light detecting elements, generating line scans using a processor based on the data generated by the array of light detecting elements, and assembling the line scans using the processor to generate an image of the object.

One embodiment is directed to an OFM device comprising a body defining a fluid channel and having light transmissive regions. The OFM devices also comprises a first one-dimensional array of light detecting elements configured to receive light from an illumination source through the light transmissive regions and generate data associated with the received light and a second one-dimensional array of light detecting elements substantially parallel to the first one-dimensional array of light detecting elements. The light detecting elements in the second one-dimensional array are configured to receive light through the light transmissive regions and generate additional data associated with the light.

One embodiment is directed to an OFM device comprising a body defining a fluid channel. The body includes an aperture surface layer proximal to the fluid channel and on a first side of the fluid channel, and an additional layer on a second side of the fluid channel opposing the first side. The OFM device also comprises an illumination source configured to provide illumination into the fluid channel through light transmissive regions in the aperture surface layer and a one-dimensional array of light detecting elements located in the additional layer. The light detecting elements are configured to receive light from the fluid channel and generate time varying data associated with the received light.

One embodiment is directed to an OFM device comprising a body defining a fluid channel, light transmissive regions in the body, a light detector, and an optical fiber bundle. The optical fiber bundle has a first end in optical communication with the fluid channel and configured to receive light from an illumination source through the light transmissive regions, and a second end in optical communication with the light detector.

One embodiment is directed to an OFM device comprising a body defining a fluid channel. The body includes a surface layer proximal to the fluid channel. The OFM device also comprises an array of light detecting elements in the body configured to receive light from the fluid channel and generate data associated with the received light, and an electrode located in the body outside the surface layer. The electrode is configured to generate a positive charge for attracting an object moving through the fluid channel to the surface layer.

One embodiment is directed to an OFM device comprising a body defining a fluid channel having a longitudinal axis and an array of light detecting elements in the body. The array of light detecting element is configured to receive light from an illumination source through the fluid channel and generate data associated with the received light. The OFM device also comprises a first electrode and a second electrode at different locations along the longitudinal axis of the fluid channel. The first electrode and the second electrode are configured to generate an electrical field that moves an object through the fluid channel in a direction parallel to the longitudinal axis of the fluid channel while substantially preventing rotation of the object.

One embodiment is directed to an OFM device comprising a body defining a fluid channel and an array of light detecting elements in the body. The array of light detecting elements is configured to receive light from the fluid channel and generate data associated with the received light. The OFM device also includes an injection unit configured to introduce an object into the fluid channel and a first focusing unit and a second focusing unit configured to generate fluid flow to move the object to a portion of the fluid channel.

One embodiment is directed to an OFM device comprising a body defining a fluid channel, an array of light detecting elements in the body, and configured to receive light from the fluid channel and generate data associated with the received light, and a laser for controlling movement of one or more objects moving through the fluid channel.

One embodiment is directed to an OFM device comprising a body defining a fluid channel. The body includes a surface layer proximal to the fluid channel. The OFM device also comprises light transmissive regions in the surface layer and a first filter located outside the surface layer, the first filter configured to pass light of a wavelength re-emitted from fluorophores in an object moving through the fluid channel. The OFM device also comprises a one-dimensional array of light detecting elements located outside the first filter, and configured to receive light passing through the first filter.

One embodiment is directed to an OFM device comprising a body defining a fluid channel. The body includes a surface layer proximal to the fluid channel. The OFM device also comprises a plurality of slits in the surface layer. The slits have different orientations with respect to a longitudinal axis of the fluid channel. The OFM device also comprises light detecting elements in the body, and configured to receive light through the slits and generate time varying data associated with the received light.

One embodiment is directed to an OFM device comprising an influx for receiving a sample, a body having a surface layer, and a plurality of OFM devices. Each OFM device comprises a fluid channel defined by the body, and adapted to receive a portion of the sample from the influx. The surface layer of the body is proximal to the fluid channel. The OFM device also comprises a one-dimensional array of light detecting elements located within the surface layer. The light detecting elements are configured to receive light passing through the fluid channel and generate time-varying data associated with the received light as the sample passes through the fluid channel. The one-dimensional array of light detecting elements extends substantially from a first lateral side to a second lateral side of the fluid channel.

One embodiment is directed to an OFM device comprising an inlet for receiving a fluid sample, an outlet, and a body defining a fluid channel coupled to the inlet and the outlet. The body has a hydrophobic surface proximal to the inlet that is configured to form a bead of the fluid sample based on surface tension. The fluid channel can passively pump the fluid sample from the inlet to the outlet based on the formation of the bead. The OFM device also comprises a light detector and an imager. The light detector is in the body and outside a first surface of the fluid channel. The light detector is configured to receive light passing through the fluid channel and generate time-varying data associated with the received light as the object passes through the fluid channel. The imager images the object using the generated time-varying data.

One embodiment is directed to an OFM device comprising a body defining a fluid channel having a first surface and a lateral surface and a light detector in the body and outside the first surface of the fluid channel. The light detector is configured to receive light from the fluid channel and generate data associated with the received light as an object moves through the fluid channel. The OFM device also comprises a first electrode in the body along the first surface, the first electrode configured to generate a charge for attracting the object moving through the fluid channel to the first surface.

One embodiment is directed to OFM device including differential interference contrast (DIC OFM device). The DIC OFM device comprises a body defining a fluid channel having a longitudinal axis. The body including a surface layer proximal to the fluid channel. The DIC OFM device also comprises light transmissive regions in the surface layer and a light detector in the body. The light detector determines at a first focal plane an image wavefront of an object based on light received from the light transmissive regions as the object passes through the fluid channel. The image process back propagates the image wavefront from the first focal plane to a second focal plane.

These and other embodiments of the invention are described in further detail below.

BRIEF DESCRIPTION OF THE DRAWINGS

FIG. 13 (b) is a schematic drawing of a top view of an OFM system having four OFM devices arranged in a 2×2 two-dimensional array, according to an embodiment of the invention.

FIG. 24(a)(2) is a schematic drawing of a perspective view of a 'plus' sign arrangement of four light transmissive regions, according to an embodiment of the invention.

DETAILED DESCRIPTION OF THE INVENTION

Embodiments of the present invention will be described below with reference to the accompanying drawings. One embodiment includes a technique for improving an OFM device by eliminating the aperture layer formerly located over the light detector layer. The OFM device of this embodiment has a body that defines a fluid channel having an upper surface and a lower surface. The body of the OFM device has a surface layer that coincides with the lower surface of the fluid channel. The illumination source is located above the upper surface of the fluid channel and provides light of suitable wavelengths onto an object (e.g., cell or micro-organism) travelling with a flow through the fluid channel.

An optical detector is in the surface layer of the body and receives light passing through the object from the illumination source and/or light re-emitted from fluorophores in the object. The optical detector includes individual light detecting elements (e.g., pixels) in the form of a one-dimensional array diagonally extending across the fluid channel. Since the one-dimensional array is diagonally positioned, the spacing between the light detecting elements across the fluid channel may be smaller than the size of the light detecting element (i.e., pixel size). With this diagonal arrangement, the resolution in the y-direction is independent of the pixel size and the optofluidic microscope is capable of imaging objects at much higher resolutions than a pixel size.

The light detecting elements in the one-dimensional array take time varying readings of the light that they receive as the object travels through the fluid channel. These time varying readings can be used to generate line scans. The time varying readings are also used to determine the rotation and velocity of the object. The OFM device uses the line scans while accounting for rotation and velocity of the object to construct an image of the object.

The OFM device of this embodiment has a simpler design than other OFM devices since it eliminates the aperture layer with light transmissive regions (apertures). This simpler design may be less expensive to manufacture. In addition, eliminating the aperture layer may improve the quality of the image generated by the OFM device as described below with respect to FIG. 2(a) and FIG. 2(b).

Figure 1A:
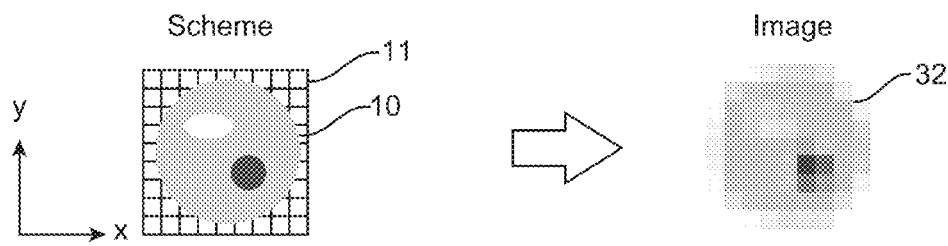
FIG. 1(a) is a schematic drawing of a top view of a lensless microscopy system.
Figure 1B:
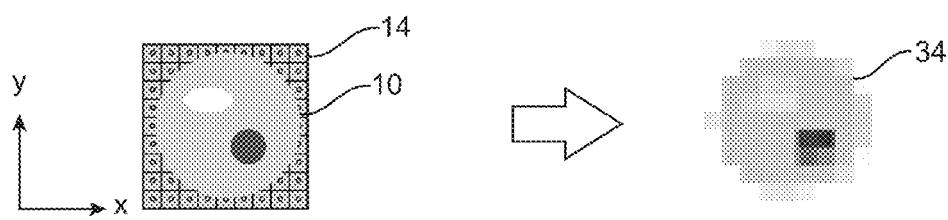
FIG. 1(b) is a schematic drawing of a top view of another lensless microscopy system.
Figure 1C:
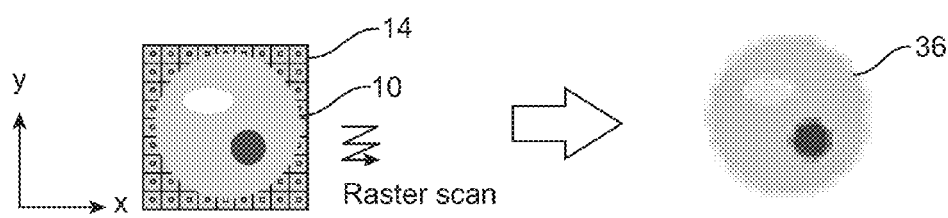
FIG. 1(c) is a schematic drawing of a top view of the system of FIG. 1(b) where raster-scanning is employed to take time varying data to generate a filled-in image.
Figure 2A:
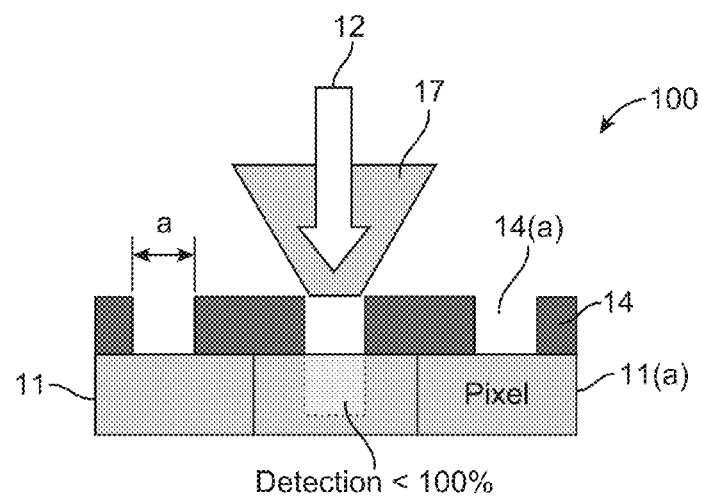
FIG. 2(a) is a cross-sectional view taken along a diagonal line showing components of an OFM device having an aperture layer, according to an embodiment of the invention.

FIG. 2(a) is a cross-sectional view taken along a diagonal line showing components of an OFM device 100 having an aperture layer 14, according to an embodiment of the invention. Three light transmissive regions 14(a) (e.g., holes) with a width "a" are shown. As illustrated, the light transmissive regions 14(a) can cause a scattering 17 of the light from an illumination source 12 at the entrance of the light transmissive regions 14(a). This scattering of light can reduce the intensity of the light received by the light detector 11 on the other side of the light transmissive regions 14(a). Due to the scattering, the light intensity detected by the light detector 11 is less than 100% of the illumination intensity originating from the illumination source 12. The detection by the light detector 11 is represented by the shaded region in the pixel. The image quality can be affected more by stray light (noise) when the detected light intensity is relatively low.

Figure 2B:
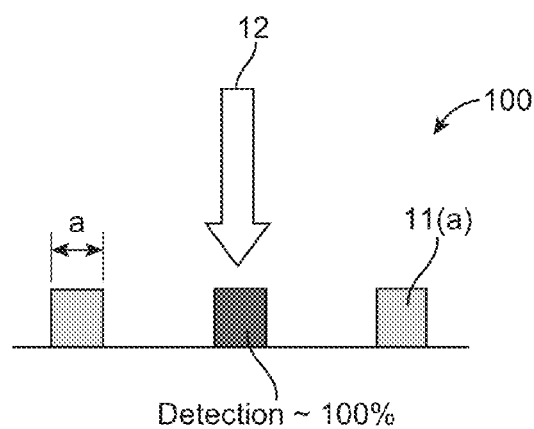
FIG. 2(b) is a schematic drawing of a side view of components of an OFM device that does not include an aperture layer, according to an embodiment of the invention.

Eliminating the aperture layer 14 avoids the scattering of light due to the light transmissive regions which may improve the signal-to-noise ratio and the image quality. FIG. 2(b) is a schematic drawing showing a cross-sectional view along a diagonal of components of an OFM device 10 that does not include an aperture layer 14, according to an embodiment of the invention. In this illustrated example, the light from the illumination source 12 is substantially unobstructed before reaching the light detecting element 11(a) (pixel). In this case, the light intensity detected is approximately 100% of the illumination intensity from the illumination source 12. This detection is represented by the light detecting element 11(a) being completely shaded. The OFM device in this example eliminates the aperture layer 14, and can provide images with a better signal-to-noise ratio than OFM devices having an aperture layer 14 under the same illumination intensity.

In general, OFM devices of embodiments of the invention provide advantages because, relative to conventional microscopes, they are inexpensive, compact, and lensless. Tens or even hundreds of individual OFM devices can be placed on a single compact device. The ability to use a multitude of microscopes on a single compact device allows for parallel imaging of large populations of cells or microorganisms. Parallel imaging allows for high throughput rates. This makes OFM devices of embodiments of the invention highly suited for various clinical applications. Moreover, OFM devices may be inexpensive and disposable. In the clinical setting, the ability to dispose of the OFM devices could reduce potential cross-contamination risks between specimens. Further, embodiments of the invention can be designed for particular applications such as diagnosing illnesses like malaria. In a Third World environment, low-cost and compact microscope systems suitable for malaria diagnosis could be a boon for health workers who often have limited access to medical facilities and need to travel from village to village.

I. OFM (Optofluidic Microscope) Device Configurations

Three configurations of OFM devices 100 are described below. The first configuration includes an OFM device 100 having an aperture layer 14 covering the light detecting elements 11(a) in the light detector 11 and the illumination source above the object 10. The second configuration eliminates the aperture layer 14. A third configuration locates the illumination source under the fluid channel and locates the light detector 11 over the fluid channel.

A. First Configuration

Figure 3A:
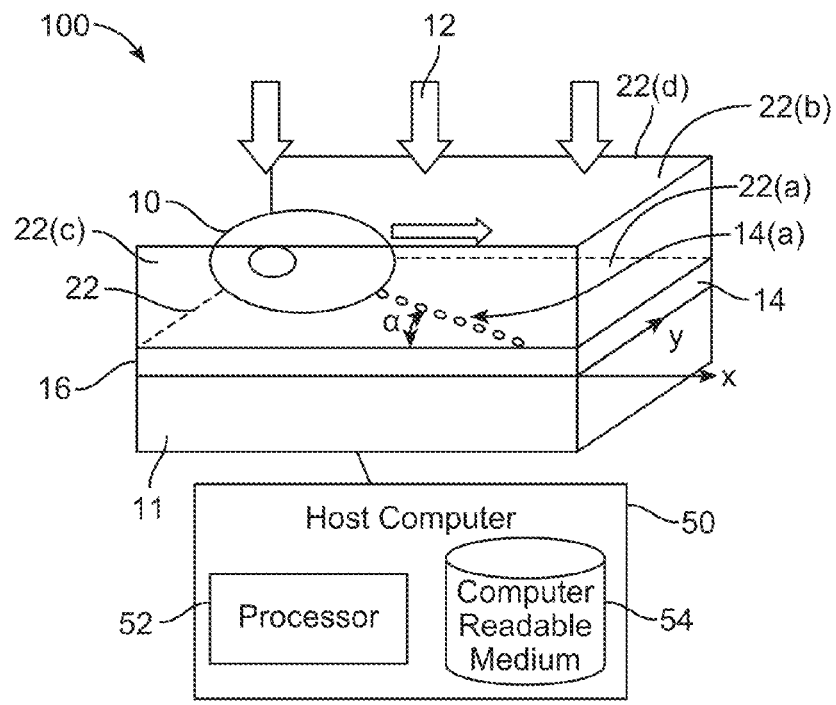
FIG. 3(a) is a schematic drawing of a perspective view of components of an OFM device in a first configuration, according to embodiments of the invention.

FIG. 3(a) is a schematic drawing of a perspective view of components of an OFM device 100 in a first configuration, according to embodiments of the invention.

The OFM device 100 includes a body 16 which defines or includes a fluid channel 22. The fluid channel 22 includes a first surface 22(a) and a second surface 22(b) on opposite sides of the fluid channel 22. The first surface 22(a) may correspond to an inner surface at the bottom of the fluid channel 22 and the second surface 22(b) may correspond to the inner surface at the top of the fluid channel 22. The fluid channel 22 also includes two opposing lateral surfaces 22(c) and 22(d).

The body 16 can be a multi-layer structure or a single, monolithic structure. In the illustrated example, the body 16 is a multi-layer structure having an opaque or semi-opaque aperture layer 14 that is an inner surface layer of fluid channel 22 having the first surface 22(a). The opaque or semi-opaque aperture layer 14 has light transmissive regions 14(a) in it. The opaque or semi-opaque aperture layer 14 can be a thin metallic layer in some cases. The body 16 may optionally include a transparent protective layer (not shown) that covers the opaque or semi-opaque aperture layer 14 to isolate the opaque or semi-opaque aperture layer 14 from the fluid and the object 10 moving through the fluid channel 22 of the OFM device 100.

The fluid channel 22 may have any suitable dimensions. For example, the width and/or height of the fluid channel 22 may each be less than about 10, 5, or 1 micron. In some embodiments, the fluid channel 22 may be sized based on the size of the objects 10 being imaged by the OFM device 100. For example, the height of the fluid channel 22 may be 10 micron where the objects 10 being imaged are 8 micron in order to keep the objects 10 close to the opaque or semi-opaque aperture layer 14, which may help improve the quality of the image. In most embodiments, the flow of the fluid in the fluid channel 22 is generally in the direction of the x-axis.

The OFM device 100 also includes a light detector 11 to the outside of the opaque or semi-opaque aperture layer 14. An illumination source 12 provides light through the second surface 22(b) of the fluid channel 22. As a fluid flows through the fluid channel 22, an object 10 in the fluid passes under the illumination source 12. The object 10 alters (e.g., blocks, reduces intensity, and/or modifies wavelength) the light through it to the light transmissive regions 14(a). The light detecting elements 11(a) detect light transmitted through the light transmissive regions 14(a).

The OFM device 100 also includes an x-axis and a y-axis that lie in the plane of the inner surface of the light detector 11 proximal to the fluid channel 22. The x-axis lies along a longitudinal axis of the fluid channel 22. The y-axis is orthogonal to the x-axis in the plane of the inner surface of the light detector 11.

The light transmissive regions 14(a) in the opaque or semi-opaque aperture layer 14 can be of any suitable shape and any suitable dimension. In the illustrated example, the light transmissive regions 14(a) are holes. The holes may be etched, for example, into the opaque or semi-opaque aperture layer 14 (e.g., a thin metallic layer). In another embodiment, the light transmissive regions 14(a) may be in the form of one or more slits. A slit can refer to an elongated opening such as a narrow rectangle. Each slit may have any suitable dimension. The slits may have uniform dimensions or may have variable dimensions. The slits can be oriented at any suitable angle or angles with respect to the x-axis of the fluid channel 22.

Figure 4:
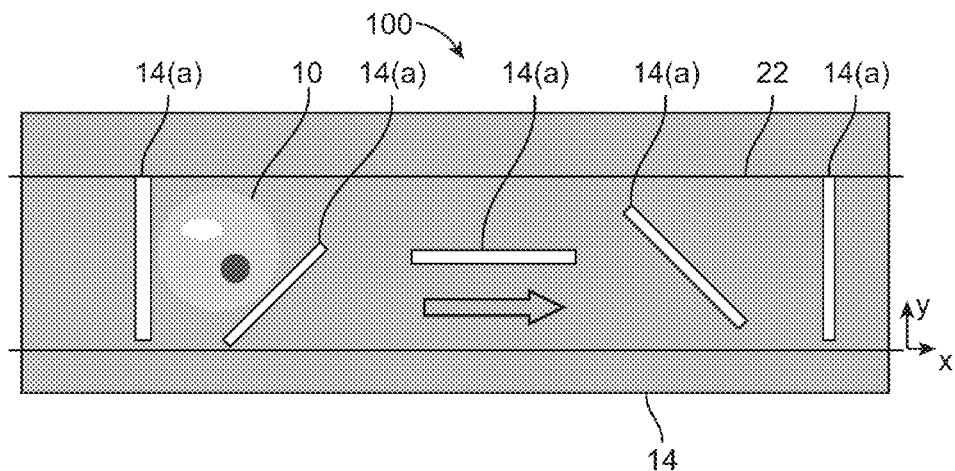
FIG. 4 is a schematic drawing of components of an OFM device including light transmissive regions in the form of slits, according to an embodiment of the invention.

FIG. 4 is schematic drawing of a top view of components of an OFM device 100 including light transmissive regions 14(a) in the form of slits, according to an embodiment of the invention. The slits are arranged along the fluid channel 22 at multiple orientations. In other examples, the slits may be arranged in a single orientation or may extend across the fluid channel 22. One advantage to having slits is that slits may be less expensive to manufacture than holes. Another advantage is that the intensity of the light though a slit is greater than through a set of holes. If the light transmissions are higher, the signal to noise ratio may be higher which can improve the performance of the OFM device 100. An example of an aperture layer having a slit can be found in Nozokido, Tatsuo, Mizuno, Koji, *Scanning Near-Field Millimeter-Wave Microscopy Using a Metal Slit as a Scanning Probe*, IEEE Transactions on Microwave Theory and Techniques, Vol. 49, No. 3, (March 2001), which is hereby incorporated by reference in its entirety for all purposes.

The light transmissive regions 14(a) can be arranged in any suitable form. Some examples of suitable forms include a one-dimensional array, a two-dimensional array, and a multiplicity of one-dimensional and/or two-dimensional arrays. The arrays can have any suitable orientation or combination of orientations.

In FIG. 3(a), the light transmissive regions 14(a) are in the form of a single one-dimensional array which extends diagonally from one lateral surface 22(c) of the fluid channel 22 to the other lateral surface 22(d) of the fluid channel 22. The one-dimensional array is located at an angle, α with respect to the x-axis. The angle, α can be any suitable angle.

Figure 5:
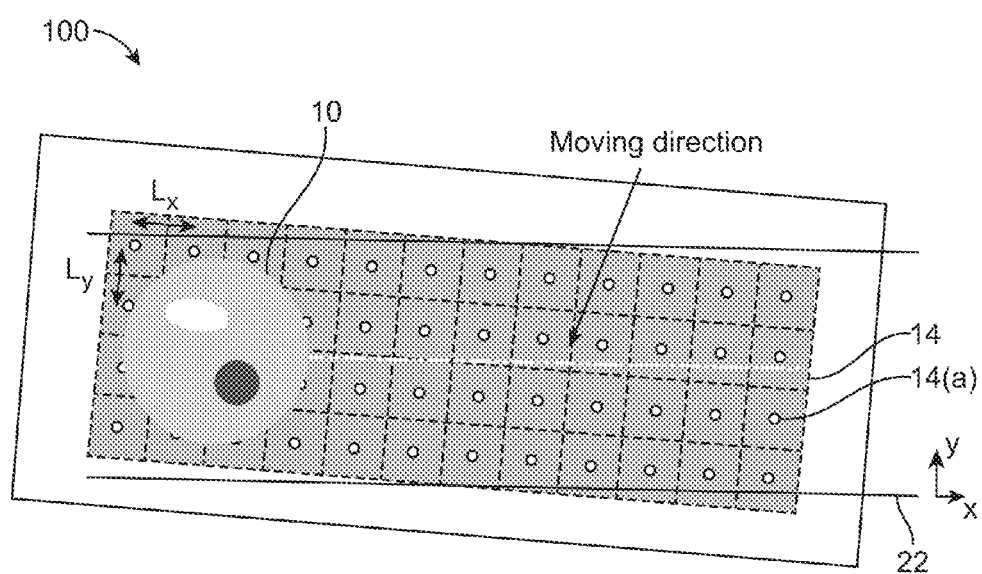
FIG. 5 is a schematic drawing of a top view of components of an OFM device having light transmissive regions in the form of a two-dimensional array oriented at an angle, $\alpha$ from the x-axis, according to an embodiment of the invention.

An example of a two-dimensional array can be found in FIG. 5, which is a schematic drawing of a top view of components of an OFM device 100 having light transmissive regions 14(a) in the form of a two-dimensional array oriented at an angle, a from the x-axis, according to an embodiment of the invention. In this example, the two-dimensional array replaces the lengthy one dimensional array. The two-dimensional array can represent four sections of the lengthy one-dimensional array shown in FIG. 3. By reducing the length of the array, the acquisition time for reading the information by the light detecting elements 11(a) may be reduced, which can increase throughput rates. Reducing acquisition time may also reduce the exposure of the object 10 to the illumination source 12, which can reduce the risk of burning the object 10. Reducing the acquisition time can also reduce the vulnerability of the object 10 to rotation and changing shape during acquisition. By avoiding these changes, the image quality can be improved and processing may be reduced. Further, reducing the length of the array can allow for a more compact OFM device 100.

The light detector 11 (e.g., photosensor) refers to any suitable device capable of detecting light and generating signals with data about the intensity, wavelength, and/or other information about the light being detected. The signals may be in the form of electrical current that results from the photoelectric effect. Some examples of suitable light detectors 11 include a charge coupled device (CCD) or a linear or two-dimensional array of photodiodes (e.g., avalanche photodiodes (APDs)) corresponding with the light transmissive regions 14(a). Light detector 11 could also be a complementary metal-oxide-semiconductor (CMOS) or photomultiplier tubes (PMTs). Other suitable light detectors 11 are commercially available.

The light detecting elements 11(a) of light detector 11 can be of any suitable size (e.g., 1-4 microns) and any suitable shape (e.g., circular or square). The light detecting elements 11(a) can be arranged in any suitable form such as a one-dimensional array, a two-dimensional array, and a multiplicity of one-dimensional and/or two-dimensional arrays. In some cases, the light detecting elements 11(a) can be arranged in the same form as the light transmissive regions 14(a). The arrays can have any suitable orientation or combination of orientations. In the illustrated example of FIG. 3, the light detecting elements 11(a) are in the form of a one-dimensional array that corresponds to the one-dimensional array of light transmissive regions 14(a).

The illumination source 12 may be a component of the OFM device 100 or may separate from the OFM device 100. The illumination source 12 may be provided by any suitable device or other source of light such as ambient light. Any suitable wavelength and intensity of light may be used. For example, the illumination source 12 may provide light with a wavelength that will cause activation of fluorophores in the object 10. The illumination source 12 may be placed in any suitable location to provide light which can pass through the object 10 and the light transmissive regions 14(a) passing through the fluid channel 22. The light provided by the illumination source 12 may be modulated over time. Suitable illumination sources are naturally and commercially available.

The OFM device 100 also includes a host computer 50 communicatively coupled to the light detector 11. The host computer 50 comprises a processor 52 (e.g., a microprocessor) coupled to a computer readable medium 54 (CRM). Alternatively, the host computer 50 can be a separate device.

The processor 50 receives signals with time varying data from the light detecting elements 11(a) of the light detector 11 associated with the light received by the light detecting elements 11(a). The data may include the intensity of the light, the wavelength(s) of the light, and/or other information about the light received by the light detecting elements 11(a). The processor 50 executes code stored on the CRM 54 to perform some of the functions of the OFM device 100 such as interpreting the time varying data from the light detector 11, generating line scans from the time varying data, and constructing an image of an object 10 moving through the fluid channel 22 from the line scans.

The CRM (e.g., memory) stores the code for performing some functions of the OFM device 100. The code is executable by the processor. In one embodiment, the CRM comprises a) code for distinguishing between different biological entities, b) code for determining the rotation and velocity of the object 10 using the data, c) code for determining changes in the shape of the object 10 using the data received from the light detecting elements 11(a), d) code for interpreting the time varying data received from the light detecting elements 11(a), e) code for performing suitable applications such as cross-correlation and fluorescence applications, f) code for generating line scans from the time varying data received from the light detecting elements 11(a), g) code for constructing one or more images from the line scans and/or other data such as rotation or changes in shape of the object 10, h) code for displaying the image, and i) any other suitable code for image processing. The CRM may also include code for performing any of the signal processing or other software-related functions that may be created by those of ordinary skill in the art. The code may be in any suitable programming language including C, C++, Pascal, etc.

Although not shown, the OFM device 100 may also include a display communicatively coupled to the processor. Any suitable display may be used. In one embodiment, the display may be a part of the OFM device 100. The display may provide information such as the image of the object 10 to a user of the OFM device 100.

Although the object 10 is shown as a cell in many embodiments, any suitable object 14 can be imaged by the OFM device 100. Suitable objects 10 can be biological or inorganic entities. Examples of biological entities include whole cells, cell components, microorganisms such as bacteria or viruses, cell components such as proteins, etc. Inorganic entities may also be imaged by embodiments of the invention.

During operation, a fluid, within which the object 10 is suspended, flows through the fluid channel 22. Any suitable mode (or modes) of controlling the flow of fluid and/or the movement of the object 10 can be employed. Any suitable devices such as micropumps, DC electrokinetic devices, dielectrophoresis electrodes, and/or hydrodynamic focusing channels can be used to control the flow of fluid and/or the movement of the object 10 through the fluid channel 22. Various modes of control are described in detail in Section V.

As the fluid flows through the fluid channel 22, the object 10 passes over the light transmissive regions 14(a). Light from the illumination source 12 passes through the fluid channel 22 and is altered (e.g., blocked, reduced intensity, and/or modified wavelength) by the object 10. The altered light passes through the light transmissive regions 14(a). Light that does not interact with the object 10 passes through the first surface 22(a) of the fluid channel 22 to the light transmissive regions 14(a) and remains substantially unaltered with the exception of scattering.

As the object 10 passes through the fluid channel 22, the light detecting elements in the light detector 11 take data (e.g., intensity and wavelength readings) of light over time. This time varying data can be used to image the object 10. In the illustrated embodiment, each light transmissive region 14(a) and the transmission of light through the light transmissive region 14(a) uniquely maps to a single light detecting element 11(a). Each discrete light detecting element 11(a) in the light detector 11 generates time varying data that can be used to generate a line scan associated with locations along the y-axis. The time varying data is communicated in the form of a signal. The time varying data from the light detecting element 11(a) is dependent on the object profile as well as its optical properties. For example, time varying data that corresponds to low intensity of light at a predetermined position for a predetermined period of time may provide data regarding the length of the object at a particular position along the y-axis in the fluid channel 22. The time varying data from the light detecting elements can be processed using a processor to construct an image of the object 10 using line scans and, optionally, other data. In one example, it is presumed that the object 10 moves in a straight line as it passes through the fluid channel 22 and over the light detecting elements 11(a) in the light detector 11 and over the light transmissive regions 14(a). In other examples, certain data can be used to determine a rotation and velocity of the object 10 as it flows along the fluid channel 22. The time varying data for each light detecting element can then be processed using a processor to form an image of the object 10 that accounts for the rotation and/or the velocity of the object 10.

In some embodiments, the processor generates an image of the object 10 accounting for the velocity of the object 10 in the direction of the longitudinal axis of the fluid channel 22. The velocity in directions orthogonal to the longitudinal axis of the fluid channel 20 are assumed to be zero in many embodiments.

For the illustrated embodiment shown in FIG. 3(a), the achievable resolution in the direction of the y-axis (i.e. y direction) of the fluid channel 22, $r_y$, is based on the spacing of adjacent light transmissive regions 14(a) in this y direction. The more light transmissive regions 14(a) in the aperture layer 14 per unit width, the higher the achievable image resolution as defined by Eq. (1) below, $$r_y = \frac{w}{n_h}, \quad (1)$$

where $n_h$ equals to the number of light transmissive regions 14(a) and w is the channel width. For example, if the channel width is 40 μm, the y-direction image resolution would be 1 micron if there are 40 equally spaced light transmissive regions 14(a) extending across the entire width of the fluid channel 22. That is, the spacing between the adjacent light transmissive regions 14(a) in the direction of the y-axis approximates the achievable image resolution in the y direction.

In the direction of the x-axis of the fluid channel 22 (i.e. the x direction), the achievable image resolution is determined by the acquisition rate of data by the light detector 11 and the net velocity of the object 10 (i.e., the resolution in x-direction is equal to object moving speed, u, times the pixel acquisition time Δt) as defined by Eq. (2), $$r_x = u\Delta t, \quad (2)$$

For example, if the target flow speed is 100 microns per second, and the light detector's reading rate is 1 KHz, the maximum image resolution in the x direction would be equal to about 0.1 micron.

Figure 3B:
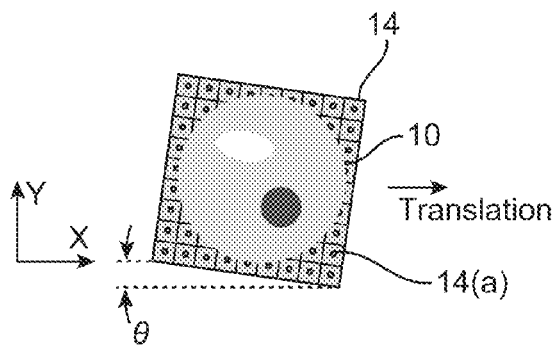
FIG. 3(b) is a schematic drawing of a top view of components of an OFM device, according to an embodiment of the invention.

FIG. 3(b) is a schematic drawing of a top view of components of an OFM device 100, according to an embodiment of the invention. The OFM device 100 includes an aperture layer 14 that covers the light detector 11 (shown in FIG. 3(a)). The aperture layer 14 has a two-dimensional array of light transmissive regions 14(a) oriented at an angle θ with respect to the longitudinal axis of the fluid channel 22. In the illustrated example, the light transmissive regions 14(a) are formed in the aperture layer 14 such that the two-dimensional array is aligned with the longitudinal axis of the aperture layer 14. The aperture layer 14 is rotated by the angle θ and then placed over the light detector 11. In other embodiments, the light transmissive regions 14(a) may be formed in the aperture layer 14 at an angle θ with respect to the longitudinal axis of the aperture layer 14.

Figure 3C:
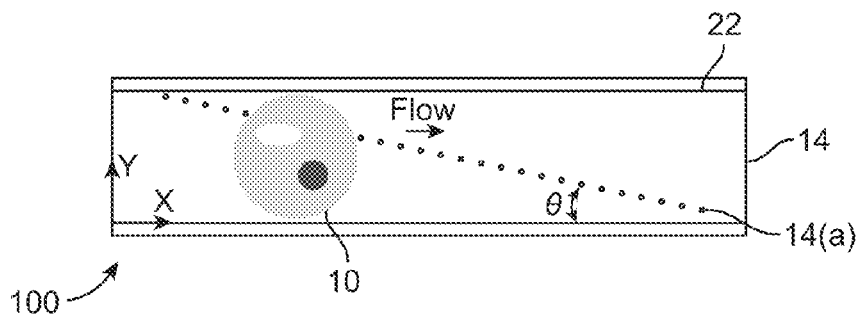
FIG. 3(c) is a schematic drawing of a top view of components of an OFM device, according to an embodiment of the invention.

FIG. 3(c) is a schematic drawing of a top view of components of an OFM device 100, according to an embodiment of the invention. The OFM device 100 includes an aperture layer 14 over the light detector 11 (shown in FIG. 3(a)). The aperture layer 14 includes light transmissive regions 14(a) in the form of a one-dimensional array (line) that is oriented at an angle (θ) from the x-axis. The OFM device 100 also includes a fluid channel 22 having a fluid within which the object 10 is suspended. The light transmissive regions 14(a) extend across the fluid channel 22. The light detecting elements 11(a) in the light detector 11 take time varying transmission data of light passing through the object 11 (or generated by fluorophores in the object) as the object 11 travels with the fluid flowing through the fluid channel 12. An image 40 can be generated by the optofluidic microscope device 100 using the time varying data generated by the light detecting elements 11(a).

B. Second Configuration

Figure 6:
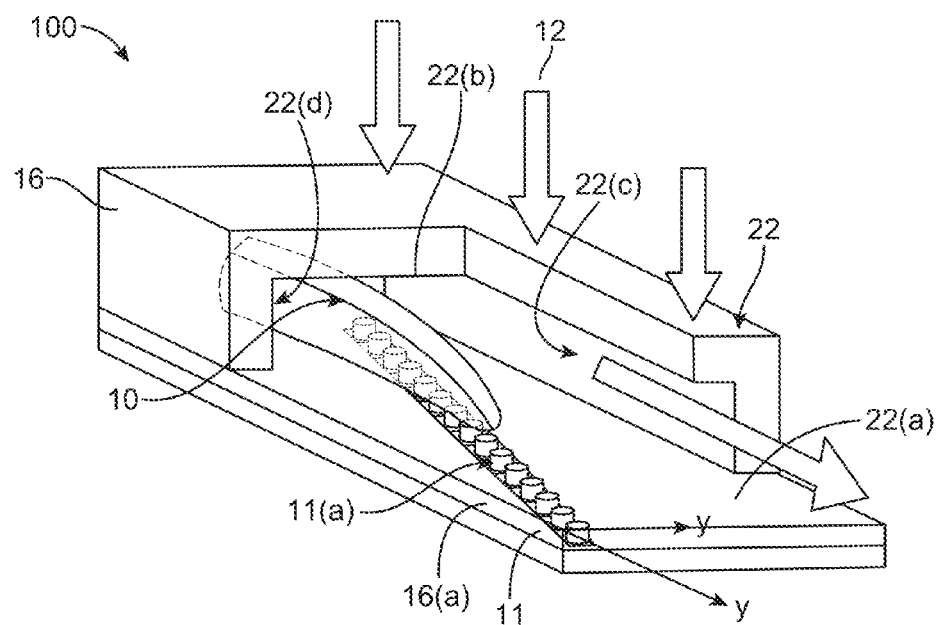
FIG. 6 is a schematic drawing of a perspective view of components of an OFM device in a second configuration, according to embodiments of the invention.

FIG. 6 is a schematic drawing of a perspective view of components of an OFM device 100 in a second configuration, according to an embodiment of the invention.

The OFM device 100 includes a body 16 which defines or includes a fluid channel 22, and a light detector 11 comprises light detecting elements 11(a). The fluid channel 22 includes a first surface 22(a) and a second surface 22(b) on opposite sides of the fluid channel 22. The first surface 22(a) may correspond to an inner surface at the bottom of the fluid channel 22 and the second surface 22(b) may correspond to the inner surface at the top of the fluid channel 22. The fluid channel 22 also includes two opposing lateral surfaces 22(c) and 22(d). The body 16 can be a multi-layer structure or a single, monolithic structure. In the illustrated example, the body 16 is a multi-layer structure having a surface layer 16(a) having the first surface 22(a) of the fluid channel 22. The light detecting elements 11(a) of the light detector 11 are located on or within the surface layer 16(a) of the body 16. In some cases, the surface layer 16(a) may be made of an opaque or semi-opaque layer that incorporates the light detecting elements 11(a). The fluid channel 22 may have any suitable dimensions.

The illumination source 12 provides light to the fluid channel 22 from outside the first surface 22(a) of the fluid channel 22. In other embodiments, the illumination source 12 may provide light from inside the fluid channel 22. As a fluid flows through the fluid channel 22, the object 10 passes over the light detecting elements 11(a) which can alter (e.g., block, reduce intensity, and/or modify wavelength) the light in some way. The light detecting elements 11(a) detect light that is not blocked.

The illumination source 12 may be a component of the OFM device 100 or may separate from the OFM device 100. Any suitable wavelength of light, intensity of light, or modulation parameters may be used.

The light detector 11 includes any suitable number and size of light detecting elements 11(a). In one embodiment, the light detecting elements 11(a) are less than or equal to one micron in diameter. Light detecting elements 11(a) can be any suitable shape such as circular, square, etc.

The light detecting elements 11(a) can be arranged in any suitable form such as a one-dimensional array, two-dimensional array, two or more one-dimensional arrays, a combination of different types of arrays, or other suitable form. If in the form of multiple arrays, the arrays can have any suitable orientation or combination of orientations.

Figure 11A:
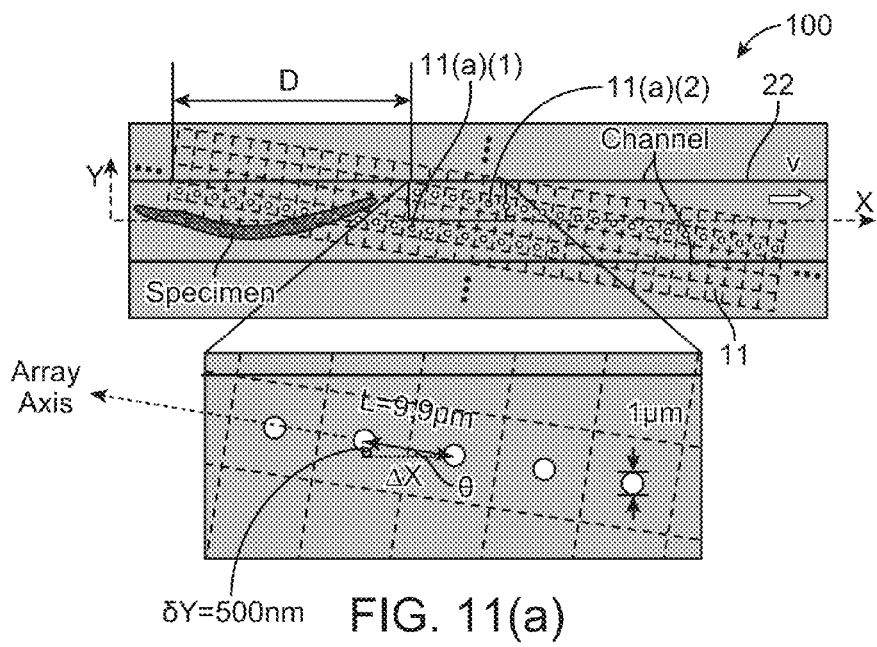
FIG. 11(a) is a schematic drawing of a top view of components of an OFM device, according to an embodiment of the invention.

In the illustrated example shown in FIG. 6, the light detector 11 includes a one-dimensional array of light detecting elements 11(a). In other embodiments, the light detecting elements 11(a) may be in the form of a two-dimensional array of light detecting elements 11(a) or multiple arrays (one-dimensional and/or two-dimensional) of light detecting elements 11(a). An example of light detecting elements 11(a) in the form of two one-dimensional arrays is shown in FIG. 11(a). The data taken from the light detecting elements 11(a) in multiple arrays can be used to measure the velocity of the object 10, the flow velocity, the rotation of the object 10, shape changes of the object 10. The data can also be used to cross correlate data derived from the light detecting elements 11(a) in the different arrays.

During operation, a fluid, within which the object 10 is suspended, flows through the fluid channel 22. Any suitable mode (or modes) of controlling the flow of fluid and/or the movement of the object 10 can be employed.

As the fluid flows through the fluid channel 22, the object 10 passes over the light detecting elements 11(a) of the light detector 11. Light from the illumination source 12 passes through the fluid channel 22 and is altered (e.g., blocked, reduced intensity, and/or modified wavelength) by the object 10. The altered light (e.g., reduced intensity, altered wavelength, etc.) passes to the light detecting elements 11(a). Light that does not interact with the object 10 passes to the light transmissive regions 14(a) as well.

Figure 7:
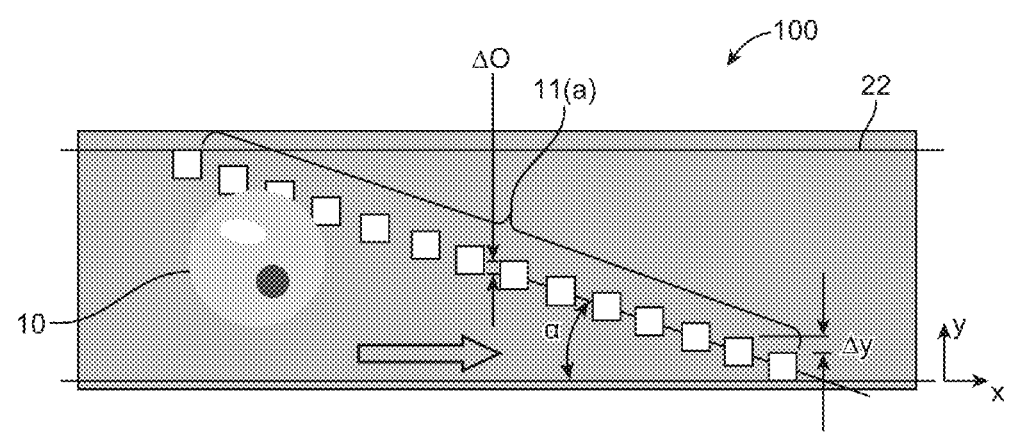
FIG. 7 is a schematic drawing of the top view of the fluid channel in the OFM device shown in FIG. 6, according to an embodiment of the invention.

FIG. 7 is a schematic drawing of the top view of components of the OFM device 100 of FIG. 6, according to an embodiment of the invention. As shown, the one-dimensional array of light detecting elements 11(a) extends from one lateral side of the fluid channel 22 to the other lateral side of the fluid channel 22. The one-dimensional array is oriented at an angle α with respect to the x-axis. The y-directional spacing between the light detecting elements 11(a), Δy 60 depends on the angle α.

In the illustrated embodiment, adjacent light detecting elements 11(a) have an overlap, ΔO 60. Adjacent light detecting elements 11(a) in the array will provide time varying data associated with the same y locations within the overlap, ΔO 60. There will be overlapping coverage by the adjacent light detecting elements 11(a) at the y locations in overlap, ΔO 60. This overlapping time varying data from adjacent light detecting elements 11(a) at the overlap, ΔO 60 can be used to improve the quality of the image of the object 10 generated by the OFM device 100.

As the object 10 passes through the fluid channel 22, the light detecting elements transmit time varying data about the light received. The time varying data is processed using a processor to generate line scans associated with y-locations of the light detecting elements. The time varying data from the light detecting element 11(a) is dependent on the profile of the object 10 as well as its optical properties. The processor constructs an image of the object 10 using the line scans and optionally other data such as rotation, velocity of the object, changes in shape of the object, etc.

For the illustrated embodiment shown in FIG. 5 and FIG. 6, the achievable resolution in the direction of the y-axis (i.e. y direction) of the fluid channel 22, $r_y$, is based on the spacing of the adjacent light detecting elements 11(a) in the y direction. The more light detecting elements 11(a) per unit width, the higher the achievable image resolution as defined by Eq. (3) below, $$r_y = \frac{w}{n_h}, \quad (3)$$

where $n_h$ equals to the number of light detecting elements 11(a) and w is the channel width. For example, if the channel width is 40 μm, the y-direction image resolution would be 1 micron if there are 40 equally spaced light detecting elements 11(a) extending across the entire width of the fluid channel 22. That is, the spacing between the adjacent light detecting elements 11(a) in the direction of the y-axis approximates the achievable image resolution in the y direction.

In the direction of the x-axis of the fluid channel 22 (i.e. the x direction), the achievable image resolution is determined by the acquisition rate of data by the light detector 11 and the net velocity of the object 10 (i.e., the resolution in x-direction is equal to object moving speed, u, times the pixel acquisition time Δt) as defined by Eq. (4), $$r_x = u\Delta t, \quad (4)$$

For example, if the target flow speed is 100 microns per second and the light detector's reading rate is 1 KHz, the maximum image resolution in the x direction would be equal to about 0.1 micron.

The second configuration of components of the OFM device 100 may provide technical advantages. By eliminating the aperture layer 14 (shown in FIG. 3), the OFM device 100 is simplified and less expensive to manufacture. In addition, eliminating the aperture layer may improve the quality of the image generated by the OFM device. An aperture layer may cause scattering of the light which reduces the intensity of the light received the light detecting elements 11(a). The image quality is affected more by noise (stray) light when the detected light intensity is relatively low. Eliminating the aperture layer 14 reduces the risk of the scattering of light which may improve the signal-to-noise ratio and the image quality.

C. Third Configuration

Figure 8:
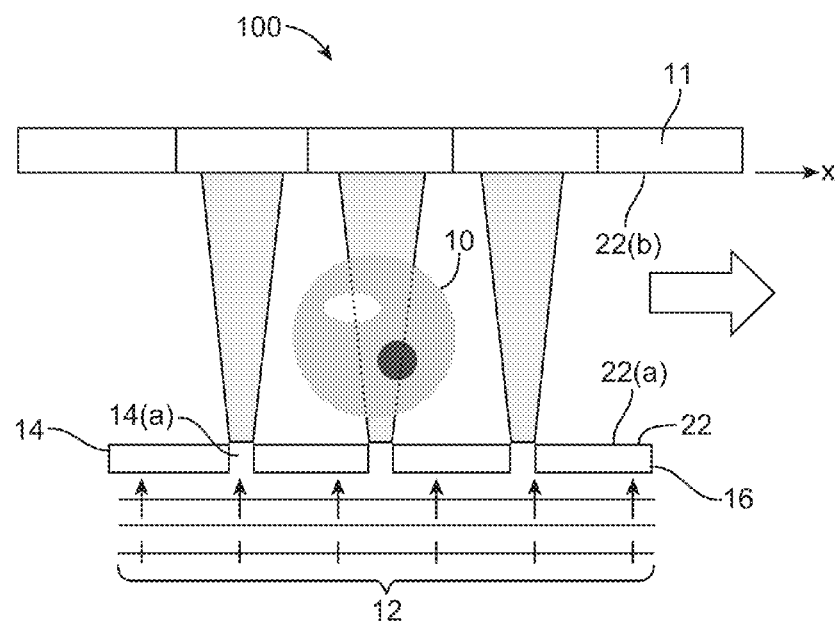
FIG. 8 is a schematic drawing of a side view of components of an OFM device in a third configuration, according to embodiments of the invention.

FIG. 8 is a schematic drawing of a side view of components of an OFM device 100 in the third configuration, according to embodiments of the invention.

The OFM device 100 includes a body 16 which defines or includes a fluid channel 22. The fluid channel 22 includes a first surface 22(a) and a second surface 22(b) on opposite sides of the fluid channel 22. The first surface 22(a) may correspond to an inner surface at the bottom of the fluid channel 22 and the second surface 22(b) may correspond to the inner surface at the top of the fluid channel 22. The fluid channel 22 also includes two opposing lateral surfaces 22(c) and 22(d). The body 16 may be made of any suitable material(s) and the fluid channel 22 may have any suitable dimensions.

The body 16 can be a multi-layer structure or a single, monolithic structure. In the illustrated example, the body 16 is a multi-layer structure having an opaque or semi-opaque aperture layer 14. The opaque or semi-opaque aperture layer 14 that is an inner surface layer of fluid channel 22 having the first surface 22($a$). The opaque or semi-opaque aperture layer 14 has light transmissive regions 14($a$) in it. The opaque or semi-opaque aperture layer 14 can be a thin metallic layer in some cases. The body 16 may optionally include a transparent protective layer (not shown) that covers the opaque or semi-opaque aperture layer 14 to isolate the opaque or semi-opaque aperture layer 14 from the fluid and the object 10 moving through the fluid channel 22 of the OFM device 100.

The opaque or semi-opaque aperture layer 14 has light transmissive regions 14($a$) in it. The light transmissive regions 14($a$) are of any suitable shape and any suitable dimension. In the illustrated example, the light transmissive regions 14($a$) are apertures (holes). The holes may be etched in a thin metallic layer. In other embodiments, the light transmissive regions 14($a$) may be in the form of one or more slits. The light transmissive regions 14($a$) can be arranged in any suitable form. Some examples of suitable forms include a one-dimensional array, a two-dimensional array, a series of one-dimensional arrays, or any suitable combination thereof. The arrays can have any suitable orientation or combination of orientations. In one exemplary embodiment, the light transmissive regions 14($a$) are in the form of a one-dimensional array diagonally extending across the fluid channel 22 at an angle with respect to the x-axis or perpendicular to the x-axis.

The light detector 11 (e.g., photosensor) refers to any suitable device capable of detecting light and generating signals with data about the intensity, wavelength, and/or other information about the light being detected. The signals may be in the form of electrical current that results from the photoelectric effect. The light detector 11 includes any number or arrangement of light detecting elements 11($a$). In one case, each light detecting element 11($a$) may correspond to a single light transmissive region 14($a$). Each light detecting element 11($a$) can be of any suitable size and any suitable shape.

The illumination source 12 is located to the outside of the opaque or semi-opaque aperture layer 14 with respect to the fluid channel 22. The illumination source 12 may be located at any suitable distance from the outer surface of the opaque or semi-opaque aperture layer 14. The illumination source 12 produces light which passes through the light transmissive regions 14($a$). As the light passes through the light transmissive regions 14($a$), the light is converted into point illumination sources from the light transmissive regions 14($a$). Light from the point illumination sources spreads out generally in a cone distribution from the light transmissive regions 14($a$) into the fluid channel 22.

As the fluid flows through the fluid channel 22, the object 10 passes over the point illumination sources from the light transmissive regions 14($a$). Light from the point illumination sources pass through the fluid channel 22 and is altered (e.g., blocked, reduced intensity, and/or modified wavelength) by the object 10. The altered light passes to the light detecting elements 11($a$). Also, light that does not interact with the object 10 passes through to the light detecting elements 11($a$).

As the object 10 passes through the fluid channel 22, the light detecting elements 11($a$) transmit time varying data about the light received. The time varying data is processed to generate line scans associated with y-locations of the light detecting elements. The time varying data from the light detecting element 11($a$) is dependent on the object profile as well as its optical properties. The processor constructs an image of the object 10 using the line scans and optionally other data such as rotation, velocity of the object, changes in shape of the object, etc.

The third configuration may provide technical advantages. In this configuration, the object 10 is sparsely illuminated by the point illumination sources as the object 10 moves through the fluid channel 22. Since the object is sparsely illuminated, it is subjected to less light during image acquisition which reduces the risk of damaging (e.g., burning) to the object 10. In addition, the light detecting elements 11($a$) in this configuration can be relatively large to collect the light from the cone shaped distribution from the light transmissive regions 14($a$) on the other side of the fluid channel 22. Larger light detecting elements 11($a$) generally have higher light detection efficiency which improves performance.

II. Other Components of OFM Devices

A. Image Processing Components

The OFM devices 100 of embodiments of the invention may include image processing components. The image processing components may include a processor (e.g., a microprocessor) coupled to a computer readable medium (CRM), and other suitable devices. Alternatively or additionally, the OFM device 100 may be communicatively coupled to a computer having a processor coupled to a CRM. The computer may process data communicated from the OFM device 100.

The processor may be integrated or separate from the light detector 11. The processor receives signals with time varying data from the light detecting elements 11($a$) of the light detector 11 associated with the light received by the light detecting elements 11($a$). The data may include the intensity of the light, the wavelength(s) of the light, and/or other information about the light received by the light detecting elements 11($a$). The processor executes code for performing some of the functions of the OFM devices 100.

The CRM (e.g., memory) stores the code for performing the functions of the OFM device 100. The code is executable by the processor. In one embodiment, the CRM comprises a) code for distinguishing between different biological entities, b) code for determining the rotation and velocity of the object 10 using the data, c) code for determining changes in the shape of the object 10 using the data received from the light detecting elements 11($a$), d) code for interpreting the time varying data received from the light detecting elements 11($a$), e) code for performing suitable applications such as cross-correlation and fluorescence applications, f) code for generating line scans from the time varying data received from the light detecting elements 11($a$), g) code for constructing one or more images from the line scans and/or other data such as rotation or changes in shape of the object 10, h) code for displaying the image, and i) any other suitable code for image processing. The CRM may also include code for performing any of the signal processing or other software-related functions that may be created by those of ordinary skill in the art. The code may be in any suitable programming language including C, C++, Pascal, etc.

The imaging components may also include a display communicatively coupled to the processor. Any suitable display may be used. In one embodiment, the display may be a part of the OFM device 100. The display may provide information such as the image of the object 10 to a user of the OFM device 100. An "imager" can refer to one or more of the image processing components. For example, an imager can be a processor communicatively coupled to a CRM having suitable code.

B. Relaying Components

Some embodiments of the invention include one or more relaying components for communicating light from the light transmissive regions 14(a) to other components of the OFM device 100. An example of a suitable relaying component is a fiber optic bundle.

Figure 9A:
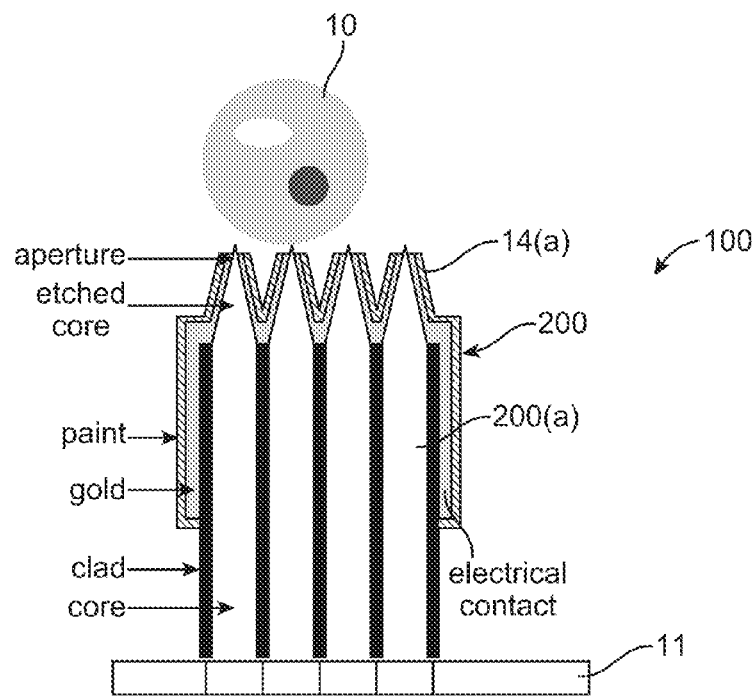
FIG. 9(a) is a schematic drawing of a side view of components of an OFM device including a fiber optic bundle, according to an embodiment of the invention.
Figure 9B:
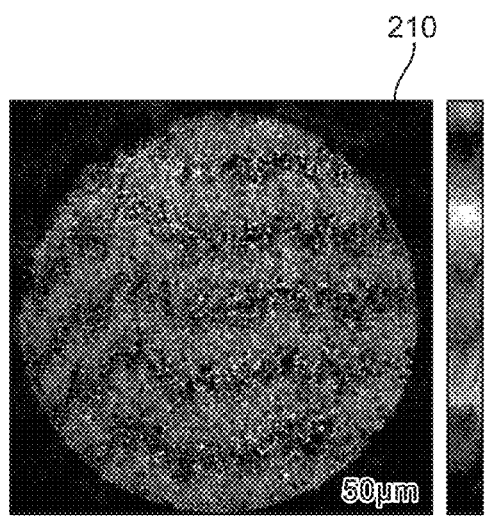
FIG. 9(b) is an image that was generated using the OFM device including the fiber optic bundle of FIG. 9(a), according to an embodiment of the invention.

FIG. 9(a) is a schematic drawing of a side view of components of an OFM device 100 including a fiber optic bundle 200, according to an embodiment of the invention. The OFM device 100 includes light transmissive regions 14(a) and a fiber optic bundle 200 having optical fibers 200(a). Each light transmissive region 14(a) is associated with a distal end of an optical fiber 200(a). The proximal ends of the optical fibers 200(a) are directed to the light detector 11. Each optical fiber 200(a) may carry the light from a single light transmissive region 14(a) to a single light detecting element 11(a) in the light detector 11. This system allows the isolation of the apertures from the detector 11. FIG. 9(b) is an image generated using an OFM device 100 of FIG. 9(a).

An example of an OFM device with a fiber bundle 200 can be found in A. Chovin, P. Garrigue, I. Manek-Honninger, N. Sojic, *Fabrication, Characterization, and Far-Field Optical Properties of an Ordered Array of Nanoapertures, Nano Letters* 4, 1965 (October, 2004), which is hereby incorporated by reference in its entirety for all purposes.

III. Systems with Multiple OFM (Optofluidic Microscope) Devices

Multiple OFM devices 100 can be located on a single device in some embodiments. The OFM devices 100 of these embodiments may be arranged in parallel, in series, or in any suitable combination thereof. Multiple OFM devices 100 may provide the capability of automated and parallel imaging of one or more objects 10.

Figure 10:
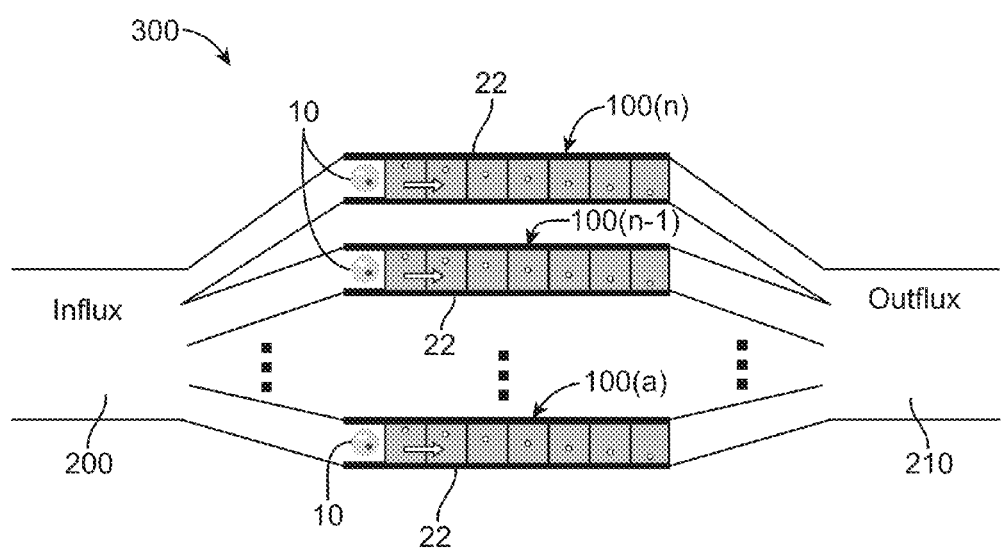
FIG. 10 is a schematic diagram of an OFM system having multiple OFM devices, according to an embodiment of the invention.

FIG. 10 is a schematic diagram of an OFM system 300 having multiple OFM devices 100, according to an embodiment of the invention. In the illustrated example, the OFM devices 100 are arranged in parallel on a single device.

Although the components of each OFM device 100 are arranged according to the first configuration, other configurations can be used. Each OFM device 100 has an aperture layer 14 with light transmissive regions 14(a) covering light detecting elements 11(a) in the form of a one-dimensional array extending diagonally across the fluid channel 22. In other embodiments, the light detecting elements 11(a) may be arranged in other forms. The OFM devices 100 of the OFM system 300 may be located within a single body such as a casing. The overall size dimensions (e.g., width, length, and/or height) of the body may be of any suitable size. In some embodiments, the overall size dimensions (e.g., width, length, and/or height) of the body may be within a range of 20 mm to 2 cm.

The OFM system 300 includes a fluid influx 200 and a fluid outflux 210. The fluid influx 200 branches into N fluid channels 22 that feed into n OFM devices 100(a)-100(n). The outlets to the n OFM devices 100(a)-100(n) converge to the fluid outflux 210 to the system 300. In operation, a sample with fluid and objects 10 may be introduced at the fluid influx 200. The fluid and objects 10 then flows into the N fluid channels 22 and out through the fluid outflux 210. In OFM system 300, multiple objects 10 can be analyzed and imaged in parallel using the n OFM devices 100.

IV. OFM Applications

Various applications can be performed using OFM devices 100 or DIC OFM devices 700 of embodiments of the invention. Some other applications can be found in U.S. patent application Ser. No. 12/398,050 entitled "Optofluidic Microscope Device with Photosensor Array," filed on Mar. 4, 2009, which is hereby incorporated by reference in their entirety for all purposes. Although certain configurations of the components of the OFM devices 100 are shown in the illustrated examples of the applications below, other configurations can be used.

A. Cross-Correlation

Embodiments of the invention can be used to perform cross-correlation and subsequent analyses based on the results from the cross-correlation. Cross correlation can refer to correlating data from two or more sets (e.g., arrays) of light detecting elements 11(a) or the images generated from the data from the two or more sets of light detecting elements 11(a). The sets of light detecting elements 11(a) may be on a single OFM device 100 or may be on multiple OFM devices 100. If the data/images correlate, other analyses may be performed such as the measurement of dimension of the object 10 using the data associated with the correlated data/images.

FIG. 11(a) is a schematic drawing of components of an OFM device 100, according to an embodiment of the invention. The OFM device 100 has a fluid channel 22 and a light detector 11 with two parallel one-dimensional arrays of light detecting elements 11(a)(1) and 11(a)(1). The light detector 11 has been rotated an angle, θ so that the arrays of light detecting elements 11(a) are diagonally extending across the fluid channel 22 at an angle, θ from the x-axis of the fluid channel 22.

The drawing in FIG. 11(a) includes an expanded view of five light detecting elements 11(a) of the parallel arrays to show the relative dimensions between the light detecting elements 11(a). In this example, the pixel size is 1 μm, the distance, L between the light detecting elements 11(a) along the array axis is 9.9 μm, and the angle between the x-axis and the array axis is θ. The y-directional spacing, δY is 500 nm and the x-directional spacing is ΔX.

Data generated by the two parallel one-dimensional arrays of light detecting elements 11(a)(1) and 11(a)(2) can be used to determine the velocity and rotation of the object 10, shape changes in the object 10, and/or flow speed variations during data acquisition. For example, the velocity can be determined from the separation between the two arrays along the x-axis and the time difference between when the object 10 passes over the first light detecting element of the first array light detecting elements 11(a)(1) and when the object 10 passes over the first light detecting element of the first array light detecting elements 11(a)(2). The separation between the two arrays along the array axis, $D_1$ is the number of pixels between the first elements multiplied by the pixel size. In this case, the $D_1$=13 pixels×1 μm=13 μm. The separation between the two arrays along the x axis, $D=D_1 \times \cos \theta$.

In addition, two images can be constructed from the two sets of data derived from the two one-dimensional arrays of light detecting elements 11(a)(1) and 11(a)(1). The differences between the images can be analyzed to determine shape changes in the object 10, flow speed variations, and/or rotations of the object 10 during data acquisition.

The two images constructed from the two sets of data can also be cross correlated to determine whether the two sets of data are accurate. The cross correlation can be used to screen out inaccurate data/images and/or determine that the data/images are accurate for use in a calculation such as an automatic measurement of the length of the object 10.

Figure 11B:
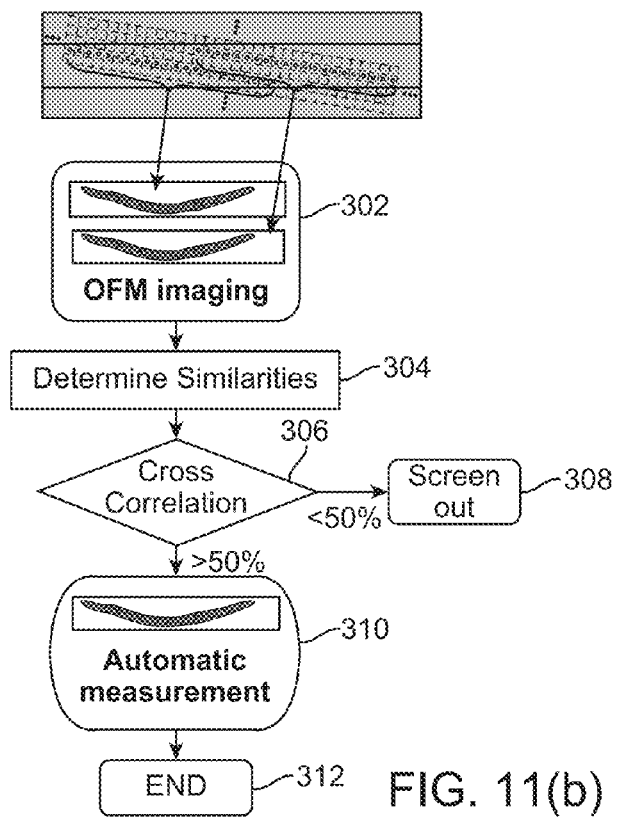
FIG. 11(b) is a flow chart of a method for cross correlating two images of an object generated using an OFM device, according to an embodiment of the invention.

FIG. 11(b) is a flow chart of a method for cross correlating two images of an object 10 generated using an OFM device 100, according to an embodiment of the invention. The method starts with constructing the images from the time varying data derived from the two parallel one-dimensional arrays of light detecting elements 11(a)(1) and 11(a)(1) (step 302). After the images are generated, the similarities between the two constructed images can be determined (step 304). In some cases, the data from each pixel pair of corresponding light detecting elements 11(a) between each of the two parallel one-dimensional arrays is compared. For example, the data from the first light detecting element in the first array may be compared to the data from the first light detecting element in the second array. Based on predefined criteria, the images are cross correlated to determine whether the images are less than or equal to 50% similar or >50% similar (step 306). If the images are less than or equal to 50% similar, then the images are screened out (step 308). If the images are >50% similar, then one or both of the images will be used in an automatic measurement (step 310) and the method ends (step 320).

B. Fluorescence Application

The OFM devices 100 of embodiments of the invention have filters and use fluorescence to image portions of objects 10. Using fluorescence provides the advantage of a more sensitive and quantitative detection of portions of the object 10. Fluorescence is an important functionality of a microscope, especially for biologists and chemists.

Figure 12A:
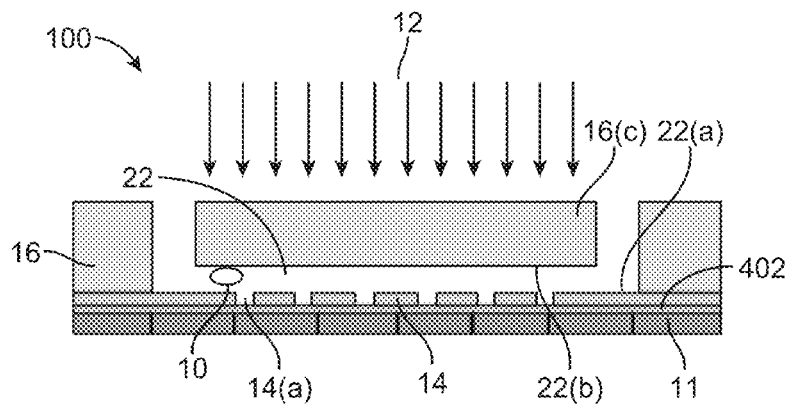
FIG. 12(a) is a schematic drawing of a sectional, side view of components of an OFM device that uses fluorescence to image portions of an object, according to an embodiment of the invention.

FIG. 12(a) is a schematic drawing of a sectional, side view of components of an OFM device 100 that uses fluorescence to image portions of an object 10, according to an embodiment of the invention.

The OFM device 100 includes a body 16 which defines or includes a fluid channel 22. The fluid channel 22 includes a first surface 22(a) and a second surface 22(b) on opposite sides of the fluid channel 22. The first surface 22(a) may correspond to an inner surface at the bottom of the fluid channel 22 and the second surface 22(b) may correspond to the inner surface at the top of the fluid channel 22. The body 16 can be a multi-layer structure or a single, monolithic structure. In the illustrated example, the body 16 is a multi-layer structure having an opaque or semi-opaque aperture layer 14 that is an inner surface layer of the fluid channel 22 having the first surface 22(a). The opaque or semi-opaque aperture layer 14 has light transmissive regions 14(a) in it. The body 16 also includes a transparent layer 16(c).

The illumination source 12 illuminates the transparent layer 16(c) of the body 16. The illumination source 12 may be integrated into the OFM device 100 or may be a separate component (e.g., an external laser). The light from the illumination source 12 may be of any suitable wavelength. In an exemplary embodiment, the light from the illumination source 12 is of certain wavelength(s) (e.g., blue light) that will excite the fluorophores tagged in the object 10. A fluorophore can refer to a component of a molecule which causes the molecule to be fluorescent. The fluorophore can absorb energy of a specific wavelength and re-emit the energy at a different (but equally specific) wavelength.

The OFM device 100 includes a filter 402 on one side of the opaque or semi-opaque aperture layer 14 and a light detector 11 on one side of the filter 402. Filter 402 can refer to any suitable device that allows light of certain wavelengths to pass and reflects light of other wavelengths. Some suitable devices include optical filters (e.g., dichroic filter), dielectric filters, etc. In one exemplary embodiment, the filter 402 is an optical color filter (e.g., a green filter) that allows light of a narrow range of wavelengths associated with a color (e.g., green) and filters out other wavelengths associated with other colors. For example, the illumination source 12 may emit blue light as an excitation light to excite certain fluorophores in portions of the object 10. The fluorophores may re-emit green light in response to being activated by the blue excitation light. The filter 402 can be a green filter that screens out the blue light from the illumination source 12 and allows green light being re-emitted from fluorophores in the object 10 to pass through to the light detector 11. Although the illustrated embodiment includes a single filter 402, other filters can be used in other embodiments. For example, another filter can be placed on a surface of the transparent layer 16(c) that allows the light of wavelengths associated with activating the fluorophores to pass and filters out light of other wavelengths.

The light detector 11 (e.g., photosensor) includes light detecting elements 11(a). The light detecting elements 11(a) may be in any suitable form such as a one-dimensional array, two-dimensional array, multiple one or two-dimensional arrays, or combination thereof. Any suitable light detecting elements can be used.

In one exemplary process, a reagent is mixed with a specimen comprising one or more objects 10. The reagent may be any suitable chemical that can tag (mark) portions (e.g., molecules of a cell nucleus) of the object 10 with fluorophores. The resulting fluid is introduced into the fluid channel 22 of the OFM device 100. As the fluid flows with the object 10 through the fluid channel 22, the illumination source 12 provides an excitation light of wavelength(s) (e.g., blue light) associated with activating the fluorophores. The excitation light passes through the transparent layer 16(c) to the fluid channel 22 to the first surface 22(a) and to the surface of the object 10. As the fluid flows through the fluid channel 22, the object 10 passes under the excitation light, which activates the fluorophores in the object 10. The object 10 passes over the light transmissive regions 14(a) which can block light and also light (e.g., green light) can be re-emitted from the fluorophores in portions of the object 10. The excitation light and the light re-emitted from the fluorophores pass through the light transmissive regions 14(a). The filter 402 reflects the excitation light and allows the light re-emitted from the fluorophores to pass through to the light detecting elements 11(a). The light detecting elements 11(a) take time varying data of the intensity of the light. The data is then used to generate images of the object 10 and the portions of the object 10 associated with the fluorophores.

Figure 12B:
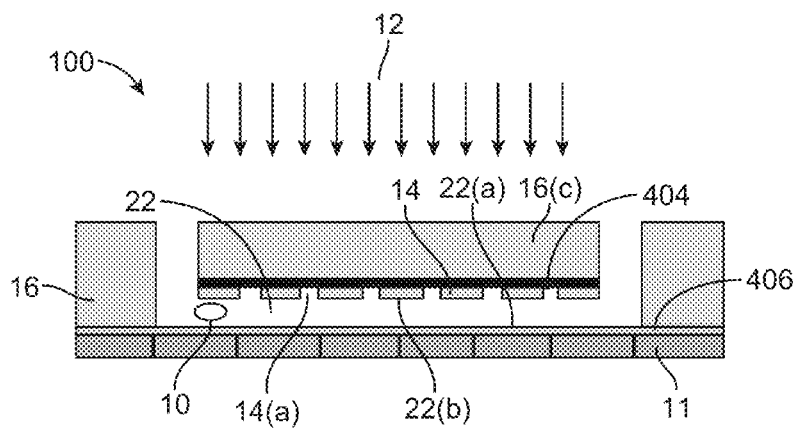
FIG. 12(b) is a schematic drawing of a sectional, side view of an OFM device that uses fluorescence to image portions of an object, according to an embodiment of the invention.

FIG. 12(b) is a schematic drawing of a sectional, side view components of an OFM device 100 that uses fluorescence to image portions of an object 10, according to an embodiment of the invention.

The OFM device 100 includes a body 16 which defines or includes a fluid channel 22. The fluid channel 22 includes a first surface 22(a) and a second surface 22(b) on opposite sides of the fluid channel 22. The first surface 22(a) may correspond to an inner surface at the bottom of the fluid channel 22 and the second surface 22(b) may correspond to the inner surface at the top of the fluid channel 22.

The body 16 can be a multi-layer structure or a single, monolithic structure. In the illustrated example, the body 16 is a multi-layer structure having an opaque or semi-opaque aperture layer 14 that is an inner surface layer of the fluid channel 22 that includes the second surface 22(b). The opaque or semi-opaque aperture layer 14 has light transmissive regions 14(a) in it. The body 16 also includes a transparent layer 16(c) on the same side of the fluid channel 22 as the opaque or semi-opaque aperture layer 14. A first filter 404 is located between the opaque or semi-opaque aperture layer 14 and the transparent layer 16(c). The body 16 also includes a second filter 406 on an inside surface layer of the fluid channel 22 having the first surface 22(a). The light detector 11 is located to the outside of the second filter 406. A fluid (not shown) flows with the object 10 through the fluid channel 22.

An illumination source 12 illuminates the transparent layer 16(c) of the body 16. The illumination source 12 may be integrated into the OFM device 100 or may be a separate component (e.g., an external laser). The light from the illumination source 12 may be of any suitable wavelength.

First filter 404 and second filter 406 can refer to any suitable devices (e.g., optical filters) that allow light of certain wavelengths to pass and reflect (or absorb) light of other wavelengths. In one exemplary embodiment, the first filter 404 is an optical color filter (e.g., a blue filter) that allows light of a narrow range of wavelengths associated with a color (e.g., blue) that is associated with exciting the fluorophores in the object 10 and filters out other wavelengths. In this example, the illumination source 12 may emit a broad spectrum of light and the filter 404 allows only the light that excites the fluorophores (e.g. blue light) to pass. The fluorophores may re-emit a light of a certain wavelength(s) (e.g., green light) in response. The second filter 406 may be an optical filter (e.g., a green filter) that allows the light being re-emitted from the fluorophores to pass and filters out other wavelengths of light. More of fewer filters can be used in other embodiments. For example, filter 404 can be omitted if the light provided by illumination source is light of a wavelength for exciting the fluorophores in the object 10.

The light detector 11 (e.g., photosensor) includes light detecting elements 11(a). The light detecting elements 11(a) may be in any suitable form such as a one-dimensional array, two-dimensional array, multiple one or two-dimensional arrays, or combination thereof. Any suitable light detecting elements can be used.

In one exemplary process, a reagent is mixed with a specimen comprising one or more objects 10. The reagent may be any suitable chemical that can tag portions (e.g., molecules of a cell nucleus) of the object 10 with fluorophores. The resulting fluid is introduced into the fluid channel 22 of the OFM device 100. As the fluid flows with the object 10 through the fluid channel 22, the illumination source 12 provides light which passes through the transparent layer 16(c). Filter 404 allows the light of wavelength(s) for exciting the fluorophores to pass and reflects light of other wavelengths. For example, filter 404 may be a blue filter that allows a blue excitation light to pass and reflects light of other wavelengths. The excitation light passes through the light transmissive regions 14(a) to generate point illumination sources. The excitation light from the point illumination sources illuminates the first surface 22(a) and the surface of the object 10. As the fluid flows, the object 10 passes under the point illumination sources of excitation light which excites the fluorophores in portions of the object 10 and blocks some light. The excitation light and the light re-emitted from the fluorophores pass through to the first surface 22(a). Filter 406 reflects the excitation light and allows the light re-emitted from the fluorophores to pass through to the light detecting elements 11(a). For example, filter 406 may be a green filter that reflects the blue excitation light and allow the green light re-emitted by the fluorophores to pass. The light detecting elements 11(a) take time varying data of the intensity of the light. The data is then used to generate images of the object 10 and the portions of the object 10 associated with the fluorophores.

Some embodiments of the invention include multiple OFM devices 100 having different filters for using fluorescence to image portions of an object 10.

Figure 13A:
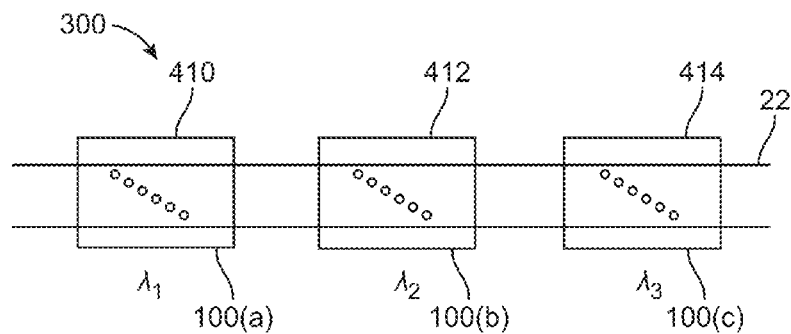
FIG. 13 (a) is a schematic drawing of a top view of an OFM system including three OFM devices in series, according to an embodiment of the invention.
Figure 13B:
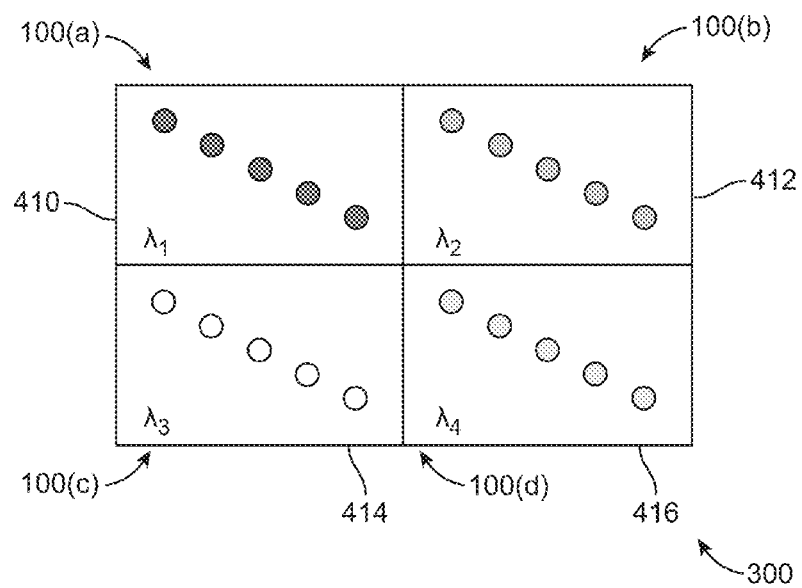

FIG. 13 (a) is a schematic drawing of a top view of an OFM system 300 having three OFM devices 100(a), 100(b), and 100(c) arranged in series, according to an embodiment of the invention. Each of the OFM devices 100(a), 100(b), and 100(c) has a different filter. The OFM device 100(a) has a filter 410 which allows light with a wavelength, $\lambda_1$ to pass. The OFM device 100(b) has a filter 412 which allows light with a wavelength, $\lambda_2$ to pass. The OFM device 100(c) has a filter 414 which allows light with a wavelength, $\lambda_3$ to pass. The OFM devices can be used to generate images from light of wavelengths $\lambda_1$, $\lambda_2$, $\lambda_3$, and $\lambda_4$. In some cases, different structures in objects 10 may re-emit different wavelengths of light. In these cases, each OFM device may have a filter associated with a specific structure. The images generated by each OFM device 100 may identify the different structures associated with the wavelengths.

FIG. 13 (b) is a schematic drawing of a top view of an OFM system 300 having four OFM devices 100(a), 100(b), 100(c), and 100(d) arranged in a 2×2 two-dimensional array, according to an embodiment of the invention. Each of the OFM devices 100(a), 100(b), 100(c), and 100(d) has a different filter. The OFM device 100(a) has a filter 410 which allows light with a wavelength, $\lambda_1$ to pass. The OFM device 100(b) has a filter 412 which allows light with a wavelength, $\lambda_2$ to pass. The OFM device 100(c) has a filter 414 which allows light with a wavelength, $\lambda_3$ to pass. The OFM device 100(d) has a filter 416 which allows light with a wavelength, $\lambda_4$ to pass.

V. Fluid Flow and Specimen (Object) Transport

On the micro and nano scale, fluid flow and specimen (object) transport through the fluid channel 22 can be accomplished using numerous different techniques. The most used techniques include traditional pressure driven flow, electrokinetic transport, discrete droplet translocation via electrowetting, or thermocapillarity techniques. Some other techniques include gravity driven flow, passive pumping based on surface tension in a hydrophobic fluid channel, hydrodynamic focusing, and dielectrophoresis electrodes, and optical tweezers. Some of these techniques are described below. Although certain configurations of OFM devices 100 are shown in the illustrated examples of the techniques below, other configurations can be used. In addition, certain configurations of OFM devices that use differential interference contract (DIC OFM device 700) such as the embodiment shown in FIG. 23 can be used.

A. Gravity Driven Flow

Figure 14:
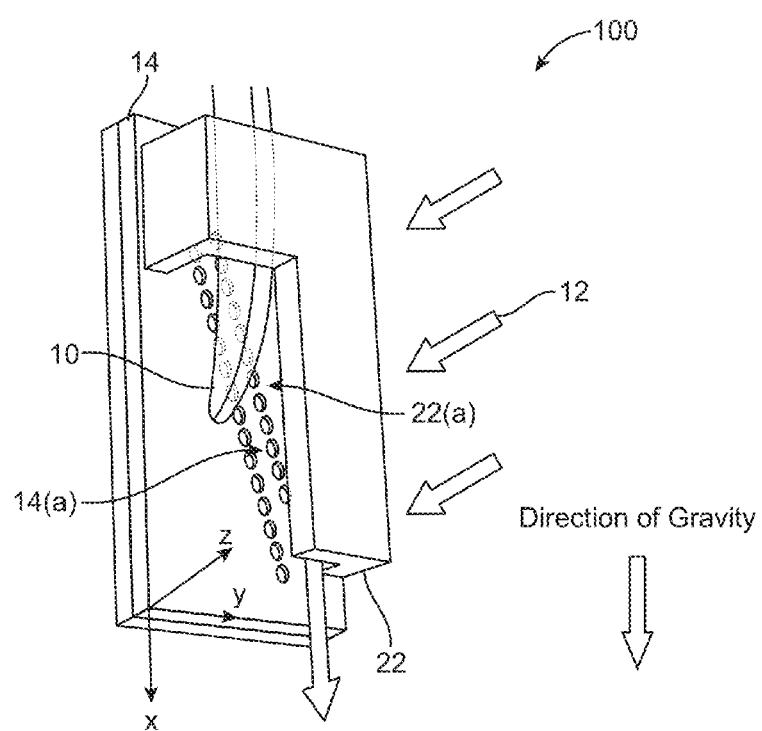
FIG. 14 is a schematic, perspective drawing of components of an OFM device that employs gravity drive flow, according to an embodiment of the invention.

FIG. 14 is a schematic, perspective drawing of components of an OFM device 100 that employs gravity drive flow, according to an embodiment of the invention. The OFM device 100 has a body 16 that forms or includes a fluid channel 22 having a first surface 22(a), an x-axis, a y-axis, and a z-axis. The body 16 includes an opaque or semi-opaque aperture layer 14 with light transmissive regions 14(a).

In the illustrated embodiment, the OFM device 100 is located so that the x-axis of the fluid channel 22 is in the direction of gravity. In operation, a specimen fluid (sample) with an object 10 can be introduced into the OFM device 100 by any suitable means such as a funnel or a syringe into a port. The specimen fluid wets the fluid channel 22 and the specimen fluid with the object 10 is continuously pulled through the fluid channel 22 by gravity, which generates fluid flow in the x-direction. One advantage of this embodiment is that using gravity can eliminate the need for bulky pumps.

In another embodiment, the OFM device 100 in FIG. 14 can be rotated (tilted) about the negative y-axis by an acute or obtuse angle during at least a portion of the image acquisition process. The OFM device 100 is rotated so that the fluid channel 22 is tilted at the angle with respect to the direction of gravity. Tilting the OFM device 100 can move the object 10 being imaged closer to first surface 22(a) above the aperture layer 14 having light transmissive regions 14(a), which can improve image resolution. In operation, the specimen fluid introduced into the OFM device 100 wets the fluid channel 22. The specimen fluid with the object 10 is continuously pulled through the fluid channel 22 by the component of gravity in the x-direction, which generates fluid flow in the fluid channel 22. The object 10 also moves toward the aperture layer 14 due to a sedimentation force caused by a component of gravity acting on the object 10 in the negative z-direction. As the object 10 moves through the fluid channel 22, the object 10 can be kept close to the first surface 22(a) due to the sedimentation force. In addition to eliminating the need for bulky pumps, this embodiment provides the advantage of moving the object 10 being imaged closer to the light transmissive regions 14(a) in the aperture layer 14, which can improve the resolution of the images.

The object 10 in the specimen fluid can be of any suitable size and weight. In some cases, the object 10 can be an elongated organism with a relatively heavy weight such as a *Caenorhabditis elegans*, a free-living nematode. An example of an OFM device 100 using gravity driven flow to image a *Caenorhabditis elegans* can be found in Cui, Xiquan, Lee, Lap Man, Heng, Xin, Zhong, Weiwei, Sternberg, Paul W., Psaltis, Demetri, Yang, Changhuei, *Lensless high-resolution on-chip optofluidic microscopes for Caenorhabditis elegans and cell imaging*, Proceedings of the National Academy of Sciences of the United States of America, Vol. 105, no. 31, pages 670-10675 (Aug. 5, 2008), which is hereby incorporated by reference in its entirety for all purposes.

Although the above embodiments with gravity driven flow have included an aperture layer 14, other embodiments remove the aperture layer 14 as shown in FIG. 6. In these embodiments, the object 10 being imaged is pulled through the fluid channel 22 and moved closer to the first surface 22(a) proximal the light detector 11 using gravity.

B. Passive Pumping Based on Surface Tension in a Hydrophobic Fluid Channel

Figure 15:
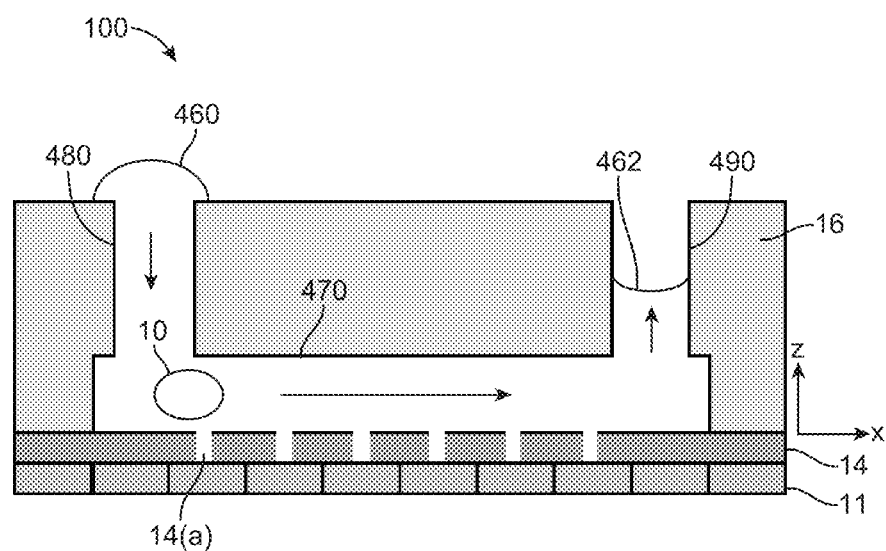
FIG. 15 is a schematic drawing of a side view of components of an OFM device employing pumping due to surface tension in a hydrophobic fluid channel, according to an embodiment of the invention.

Another technique for generating fluid flow in an OFM device 100 is to passively pump a specimen fluid (sample) with an object 10 through a hydrophobic fluid channel 470 by employing surface tension. FIG. 15 is a schematic drawing of a side view of components of an OFM device 100 employing passive pumping based on surface tension in a hydrophobic fluid channel 470, according to an embodiment of the invention. The OFM device 100 has a body 16 that forms or includes a hydrophobic fluid channel 470 having an x-axis and a z-axis. The body 16 also includes an opaque or semi-opaque aperture layer 14 with light transmissive regions 14(a) and a light detector 11.

The body 16 also includes an inlet 480 and an outlet 490 connected to opposite ends of the hydrophobic fluid channel 470. The surface of the body 16 in the vicinity of the inlet 480 is coated with, or made of, any material (e.g., a hydrophobic material) that will allow a bead 460 to form when a fluid sample is introduced onto or in the inlet 480. An inlet can refer to a port where the specimen fluid can be introduced into the fluid channel 470. The outlet 490 can refer to a port where the specimen fluid can exit the fluid channel 470. In other embodiments, additional ports can be connected to the fluid channel 470. The illustrated example also includes a bead 460 formed from a drop of the specimen fluid located at the opening of the inlet 480 and a concave meniscus surface 462 in the outlet 490. Although the inlet 480 and outlet 490 are shown parallel to the z-axis in the illustrated embodiment, they may be in any suitable direction in other embodiments. In addition, the inlet 480 and/or the outlet 490 may be connected to the fluid channel 470 at other locations, or may be separate from the body 16 in other embodiments.

The hydrophobic fluid channel 470 can refer to a fluid channel having a surface that is at least partially made of a hydrophobic material. A hydrophobic material can refer to a material that has hydrophobic properties that repel the specimen fluid with the object 10 and other suitable polarized liquids such as water. The hydrophobic material can have properties with any suitable level of hydrophobicity. An example of a hydrophobic material with a high level of hydrophobicity is polydimethylsiloxane (PDMS). An example of a hydrophobic fluid channel made of PDMS that uses a passive pumping technique to generate fluid flow can be found in Walker, Glenn M., Beebe, David, *A passive pumping method for microfluidic devices*, Lab Chip, pages 131-134, (2002), which is hereby incorporated by reference in its entirety for all purposes. The hydrophobic fluid channel 470 can be of any suitable size. In many embodiments, the hydrophobic fluid channel 470 is a microfluidic channel.

In operation, the specimen fluid with the object 10 is introduced at the inlet 480 of the OFM device 100. A drop of the specimen fluid is placed at the opening of the inlet 480. The drop forms a bead 460 due to surface tension on the drop caused by the hydrophobic properties of the hydrophobic fluid channel 470 and body 16 in the vicinity of the inlet 480. The bead 460 has a concave surface facing into the fluid channel 470. As the drop forms the bead 460, an internal pressure builds inside the bead 460 which causes a pressure into the fluid channel 470. The surface tension of the fluid sample generates a concave meniscus surface 462 facing toward the end of the fluid channel 470. As the concave meniscus surface 462 forms, a negative pressure is generated, pulling the fluid sample toward the outlet 490. The combination of positive pressure pushing into the fluid channel 470 at the inlet 480 and negative pressure pulling the fluid sample through the fluid channel 470 pumps the specimen fluid from the inlet 480 to the outlet 490 generating a fluid flow.

One advantage of using embodiments that employ pumping due to surface tension is that they eliminate the need for bulky pumps. An example of OFM devices 100 that use this pumping technique to image *Giardia lamblia* trophozoites can be found in Lee, Lap Man, Cui, Xiquan, Yang, Changhuei, *The Application of on-chip Optofluidic Microscopy for Imaging Giardia lamblia Trophozoites and Cysts*, Biomedical Microdevices, Vol 11 (5), pages 951-958 (October 2009), which is hereby incorporated by reference in its entirety for all purposes.

C. DC Electrokinetics

In many embodiments, generating quality images of an object 10 requires that the object 10 does not change shape, maintains a uniform speed, and maintains the same orientation during the image acquisition process. In some cases, significant deviations in shape, speed, or orientation can introduce distortions in the image generated. One technique for maintaining an object 10 at a uniform speed and the same orientation is to use a DC electrokinetic drive (pump). Incorporating a DC electrokinetic drive (pump) into an OFM device 100 may provide a compact means for controlling speed of the object 10 and for ensuring that the object 10 maintains a constant orientation during the imaging acquisition process. A DC electrokinetic drive can also be used to control the movement of the object 10 and cause the object 10 to follow a certain path through the fluid channel 22. The addition of a DC electrokinetic drive improves the capability of the OFM device 100 to more easily image objects 10. Examples of devices that use DC electrokinetics can be found in Hughes, M. P., Nanoelectromechanics in Engineering and Biology, CRC Press (2003) and Probstein, R. F, Physicochemical Hydrodynamics, Wiley, $2^{nd}$ Edition (2003).

In many embodiments, a pressure difference (gradient) in the fluid channel 22 contributes to generating a fluid flow through the fluid channel 22. A non-slip boundary condition existing on the walls of the fluid channel 22 results in a fluid flow with a laminar velocity profile that is parabolic, which is known as Poiseulle flow. The parabolic velocity profile results in an uneven distribution of drag force on the object 10 moving through the fluid channel 22, which can generate a torque rotating the object 10.

Figure 16A:
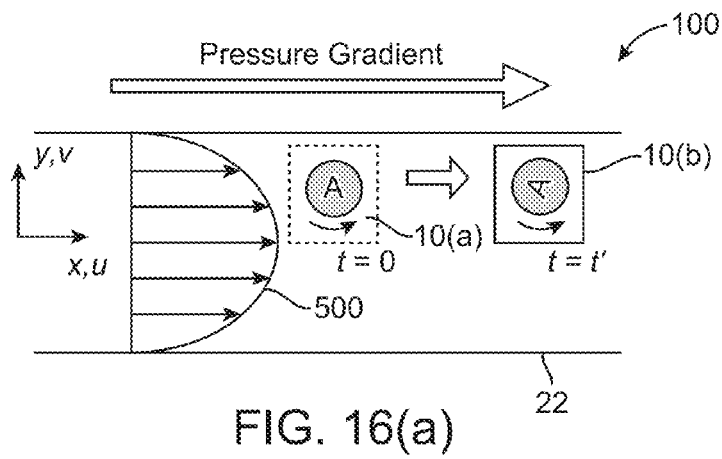
FIG. 16(a) is a schematic drawing of a top view of components of an OFM device having a fluid channel with a parabolic velocity profile, according to an embodiment of the invention.

FIG. 16(a) is a schematic drawing of a top view of components of an OFM device 100 having a fluid channel 22 with a parabolic velocity profile 500 due to a pressure gradient, according to an embodiment of the invention. The OFM device 100 has a fluid channel 22 having an x, u-axis and a y, v-axis. The object 10(a) starts moving in the y direction at t=0. The object 10(a) is subjected to Poiseulle flow with an uneven velocity distribution represented by the parabolic velocity profile 500. At t=t', the uneven drag forces due to the uneven velocity distribution have caused the object 10(b) to rotate.

In some embodiments, DC electrokinetics may provide a simple and direct way to control the motion and suppress the rotation of an object 10. For example, a DC electrokinetic drive can impose a uniform electric field in the fluid channel 22. This electric field induces a dipole in the object 10 which will align the object 10 along the electric field lines due to the electro-orientation effect. At the same time, the object 10 which typically carry a net negative charge will be subjected to an electrophoretic force which can translate the object 10 through the fluid channel 22. The velocity dependent viscous Stokes drag force can balance with the electrophoretic force, resulting in a constant or substantially constant rotation-free translational motion of the object 10 through the fluid channel 22. An electrokinetic drive can also impose a non-uniform electric field to control the motion of the object 10 inside the fluid channel 22. Using this non-uniform electric field the object 10 can be controlled to move in a defined path. For example, the object 10 can be contained to a layer above the aperture layer 14 or move the object 10 to the centerline between the lateral sides of the fluid channel 22.

Figure 16B:
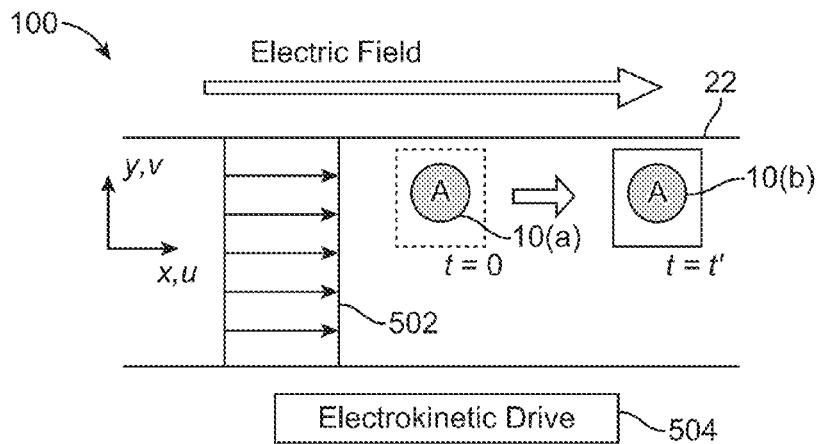
FIG. 16(b) is a schematic drawing of a top view of components of an OFM device having a fluid channel with the constant velocity profile, according to an embodiment of the invention.

FIG. 16(b) is a schematic drawing of a top view of components of an OFM device 100 having a DC electrokinetics drive 504 generating a constant velocity profile 502 in a fluid channel 22, according to an embodiment of the invention. The fluid channel 22 has an x, u-axis and a y, v-axis. The DC electrokinetics drive 504 imposes the uniform electric field 502 in the fluid channel 22 that causes a constant net force on the object 10 creating the constant velocity profile 502.

As the object 10(a) starts at t=0 to move through the fluid channel 22, the object 10(a) is under the constant velocity profile 502 which causes pure translation without rotation. At t=t', the object 10(b) has translated to a new position under the constant velocity profile 502 without rotation. Using an electrokinetics drive 504, the object 10 can be oriented with the electric field 502 to maintain certain orientation and translate with a constant velocity.

The DC electrokinetics drive 504 can also cause translation of the object 10 through the fluid channel 22. In many cases, lateral walls of the fluid channel 22 are surface charged. There is an accumulation of counterions building up adjacent to the lateral walls, forming an electric double layer (EDL). The application of the electric field by the DC electrokinetics drive 504 can cause the translation of the electric double layer (EDL) at the surface charged channel walls. This phenomenon is known as electroosmosis. Under the thin EDL assumption, the electroosmotic plug-like constant velocity profile will exert a symmetrical shear stress distribution and constant net force on the object 10. In steady-state situations, the resulting translation is also non-rotational.

In many embodiments, the DC electrokinetic drive 504 imposes the electric field 502 in the fluid channel 22 using electrodes. Any suitable number and type of electrode can be used. For example, a platinum or gold electrode can be used. The electrodes are placed in any suitable position to generate the desired electric field. For example, the electrodes may be placed externally outside the body 16 of the OFM device 10 and/or integrated into the body 16 of the OFM device 100. Although the illustrated arrangements of electrodes are shown in the examples below, other arrangements can be used.

(1) External Electrodes

In some embodiments, the OFM device 100 includes a DC electrokinetic drive 504 comprising two or more external electrodes. In one example, a DC electrokinetic drive 504 includes a pair of electrodes (positive and negative) placed at opposite ends of the fluid channel 22. The two electrodes impose a uniform electric field in the fluid channel 22. The uniform electric field induces a dipole in the object 10 which aligns the object 10 along the electric field lines due to the electro-orientation effect. At the same time, the object 10 which typically carries a net negative charge will be subjected to an electrophoretic force which can translate the object 10 through the fluid channel 22. The velocity dependent viscous Stokes drag will eventually balance with this force and result in a constant rotation-free translational motion of the object 10 through the fluid channel 22.

Figure 17:
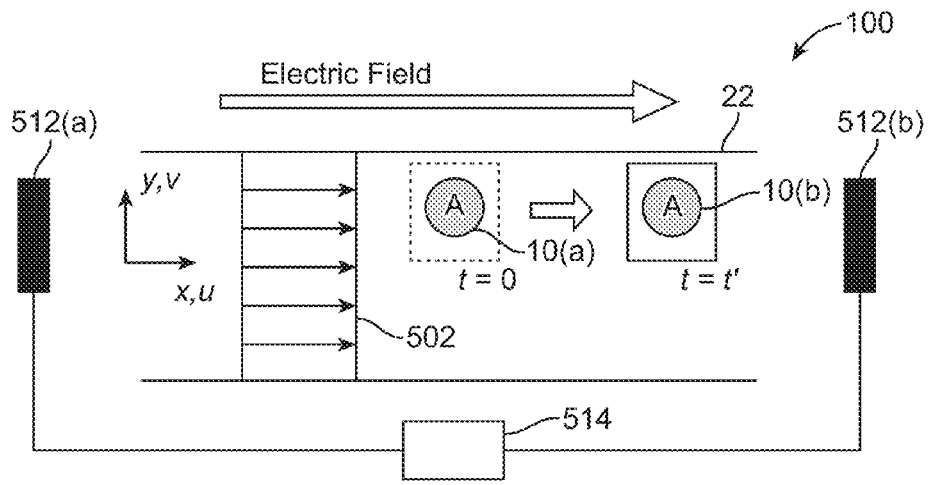
FIG. 17 is a schematic drawing of a top view of components of an OFM device having an DC electrokinetic drive with two external electrodes, according to an embodiment of the invention.

FIG. 17 is a schematic drawing of a top view of components of an OFM device 100 having an DC electrokinetic drive with two external electrodes 512(a) and 512(b), according to an embodiment of the invention. The OFM device 100 also includes a power supply 514 connected to the first electrode 512(a) and the second electrode 512(b). The OFM device 100 includes a body that forms or includes a fluid channel 22 having an x, u-axis and a y, v-axis. The first external electrode 512(a) and second external electrode 512(b) are at different locations along the fluid channel 22. For example, the first external electrode 512(a) can be located at the inlet of fluid channel 22 and the second external electrode 512(b) can be located at the outlet of the fluid channel 22. In this example, the first electrode 512(a) is a positive electrode and the second electrode 512(b) is a negative electrode in order to impose a uniform electric field 502 that causes an electrophoretic force on the object 10 in the x-direction. In other embodiments, the charge on the first and second electrodes 512(a) and 512(b) may be reversed to reverse the direction of the electrophoretic force on the object 10.

The power supply 514 can be any suitable device (e.g., a battery) for providing a voltage suitable for generating the electric field 502 in the fluid channel 22. In one example, the power supply 514 provides a voltage range from 15V-30V to drive the motion of the object 10 in the OFM device 100. The power supply 514 can be separate from or a part of the OFM device 100. In some embodiments, the aperture layer 14 of the OFM device 100 has a passivation layer to prevent electrolysis and dielectric breakdown of the aperture layer 14, which can cause bubble generation.

In the illustrated embodiment, the uniform electric field 502 causes a constant net force on the object 10 in the x-direction creating the constant velocity profile 502. As the object 10(a) starts at t=0 to move through the fluid channel 22, the object 10(a) is under the constant velocity profile 502 which causes pure translation without rotation. At t=t', the object 10(b) has translated to a new position under constant velocity profile 502 without rotation. Using an electrokinetics drive 504 with two external electrodes 512(a) and 512(b), the object 10 can be oriented with the electric field 502 to maintain certain orientation and translate with a constant velocity. Examples of OFM devices 100 with an electrokinetics drive

504 having two external electrodes 512(*a*) and 512(*b*) that have been shown to suppress rotational motion of spherical/ellipsoidal objects 10, namely mulberry pollen spores, can be found in *Chlamydomonas reinhardtii*, polystyrene microsphere in Cui, Xiquan, Lee, Lap Man, Heng, Zhong, Weiwei, Sternbert, Paul W., Psaltis, Demetri, Yang, Changhuei, *Lensless high-resolution on-chip optofluidic microscopes for Caenorhabditis elegans and cell imaging*, Proceedings of the National Academy of Science, Vol. 105 (31), 10670 (2008), which is hereby incorporated by reference in its entirety for all purposes.

(2) Integrated Electrodes

In some embodiments, the OFM device 100 includes a DC electrokinetic drive 504 comprising two or more electrodes integrated in the body 16 of the OFM device 100. Standard micro-fabrication techniques can be used to pattern the integrated electrodes onto the body. For example, integrated electrodes can be patterned on a surface of the fluid channel 22. The fluid channel 22 can then be passivated by adding a dielectric layer such as a layer of Polymethyl Methacrylate (PMMA). Using integrated electrodes, a non-uniform DC electric field can be generated to control the movement of the object 10 through the fluid channel 22.

(a) Electrokinetic Focusing and Containing Objects Near the Surface

In some embodiments, an OFM device 100 having two or more integrated electrodes can be used to focus an object to a path through an OFM region and just above a surface of the fluid channel above the light transmissive regions or light detector. These embodiments keep the object 10 along this path. An advantage of these embodiments is that the image resolution can be improved by moving the object 10 to follow this path.

Figure 18A:
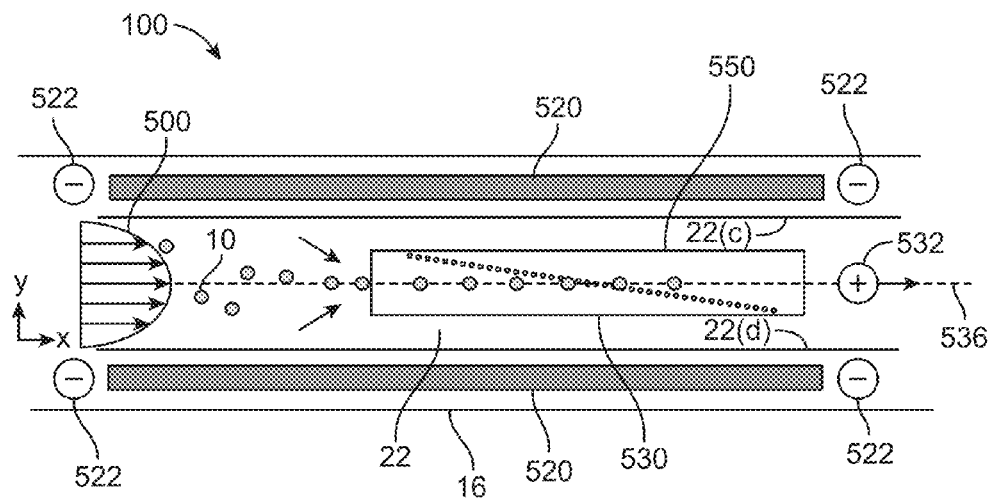
FIG. 18(a) is a schematic drawing of a top view of components of an OFM device including integrated electrodes, according to an embodiment of the invention.
Figure 18B:
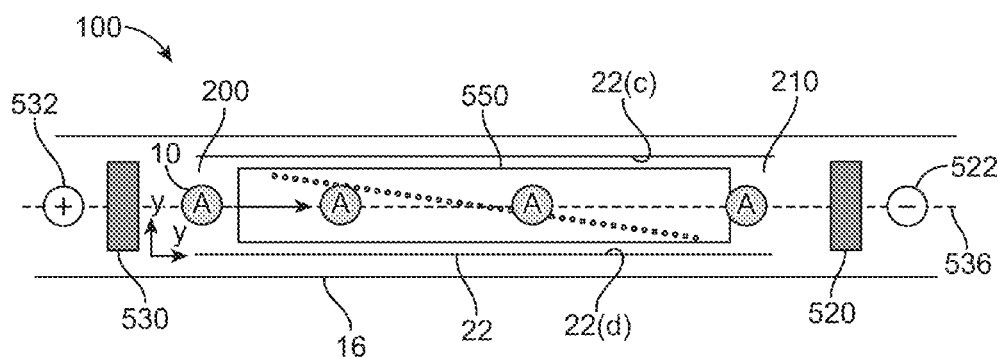
FIG. 18(b) is a schematic drawing of a top view of components of an OFM device including integrated electrodes, according to an embodiment of the invention.

FIG. 18(*a*) is a schematic drawing of a top view of components of an OFM device 100 including integrated electrodes 520 and 530, according to an embodiment of the invention. The body 16 forms or includes a fluid channel 22. The body 16 also has an aperture layer 14 having light transmissive regions 14(*a*) and an OFM region 550. The OFM region 550 can refer to the portion of the first surface 22(*a*) of the fluid channel 22 above the light transmissive regions 14(*a*) or the light detector 11. The fluid channel 22 includes an x-axis, a y-axis, and a centerline 536 parallel to the x-axis and midway between the lateral sides of the OFM region 550. The fluid channel 22 also includes a parabolic velocity profile 500 due to a pressure gradient.

In the illustrated example, the body 16 includes a pair of parallel strips of negative integrated electrodes 520 and a positive integrated electrode 530. The strips of negative integrated electrodes 520 are located along the fluid channel 22 parallel to the x-axis. The negative electrodes 520 are located at or outside the lateral surfaces 22(*c*) and 22(*d*) of the fluid channel 22. The negative integrated electrodes 520 create a negative charge 522 at the lateral surfaces 22(*c*) and 22(*d*) of the fluid channel 22. The positive integrated electrode 530 is located outside the first surface 22(*a*) of the fluid channel 22 and is within the OFM region 550. The positive integrated electrode 530 creates a positive charge 532 within the OFM region 550. The positive electrode 530 may be all or a portion of the aperture layer 14 or it may be separate from the aperture layer 14. A power supply 514 (shown in FIG. 17) provides power to the negative integrated electrodes 520 and the positive integrated electrode 530.

In operation, a pressure gradient along the fluid channel 22 generates a mean fluid flow of the sample fluid having an object 10 in the x-direction. Since many objects 10 are negatively charged, there will be an electrostatic attraction between the object 10 and the positively charged first surface 22(*a*) at the OFM region 550 and an electrostatic repulsion between the objects 10 and the negatively charged lateral surfaces 22(*c*) and 22(*d*) proximal the negative integrated electrodes 520. The electrostatic attraction will move the object 10 toward the centerline 536 and toward the first surface 22(*a*) of the fluid channel 22. In addition, the electrostatic repulsion will move the object 10 away from the lateral surfaces 22(*c*) and 22(*d*) and toward the centerline 536. As the object 10 moves through the fluid channel 22 in the x-direction, the object 100 will move and be confined to a path at the centerline 536 at a plane above the first surface 22(*a*) in the OFM region 550 to maintain the object 10 in close proximity to the light transmissive regions 14(*a*) during image acquisition.

(b) Electro-Orientation for Proper Alignment

In other embodiments, a pair of integrated electrodes can be placed on the first surface 22(*a*) of the fluid channel 22 to align the object 10 along the electric field direction due to the effect of electro-orientation. The localized electric field near the first surface 22(*a*) can also electrically trap the object 10 (e.g., biological cell) and ensure the object 10 translates in close proximity to first surface 22(*a*). The integrated electrodes can be brought closer to inside the fluid channel 22 to generate the same amount of electric field at a lower applied voltage as compared with the external electrodes. One advantage of this embodiment is that reducing the applied voltage can prevent breakdown problem and bubble generation.

FIG. 18(*b*) is a schematic drawing of a top view of components of an OFM device 100 having integrated electrodes, according to an embodiment of the invention. The OFM device 100 has a body 16 forming a fluid channel 22 having an x-axis and a y-axis. A negative integrated electrode 520 and a positive integrated electrode 530 are at different locations along the x-axis of the fluid channel 22 outside the first surface 22(*a*). The negative integrated electrode 520 creates a negative charge 522 at its location and the positive integrated electrode 530 creates a positive charge 532 at its location along the fluid channel 22. The integrated electrodes 512(*a*) and 512(*b*) impose an electric field that causes an electrophoretic force on the object 10 in the x-direction. In other embodiments, the charge on the first and second integrated electrodes 512(*a*) and 512(*b*) may be reversed to reverse the direction of the electrophoretic force on the object 10.

In the illustrated embodiment, the uniform field causes a constant net force on the object 10 in the x-direction creating a constant velocity profile, which causes pure translation without rotation. Using two integrated electrodes at opposite ends of the fluid channel 22, the object can be maintained at a constant orientation and translated with a constant velocity.

D. Hydrodynamic Focusing

Hydrodynamic focusing may improve throughput rates as well as provide control over the motion of objects 10 in the fluid channel 22 during image acquisition.

Figure 19:
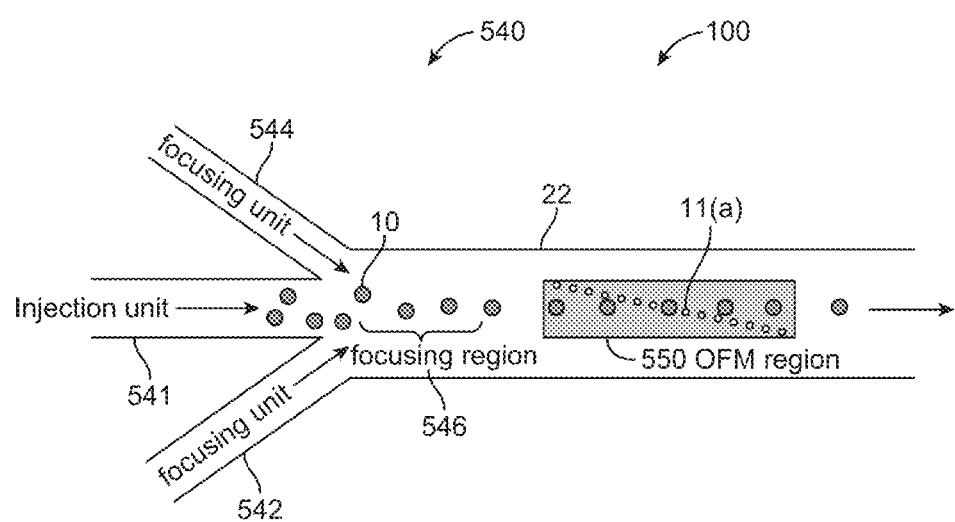
FIG. 19 is a schematic drawing of a top view of components of an OFM device with a hydrodynamic focusing unit, according to an embodiment of the invention.

FIG. 19 is a schematic drawing of a top view of components of an OFM device 100 with a hydrodynamic focusing unit 540, according to an embodiment of the invention. The hydrodynamic focusing unit 540 includes an injection unit 541 that introduces the specimen suspension with objects 10 into the hydrodynamic focusing unit 540. The hydrodynamic focusing unit 540 also includes a first focusing unit 542 and second focusing unit 544 that create sheath streams to move the objects 10 into the center (to the centerline) or another appropriate location of the fluid channel 22. The objects 10 move through a focusing region 546 where the objects 10 can be stabilized to translate without rotation into the OFM region 550. In the OFM region 550, the objects 10 will pass over the light detecting elements 11(a) in the fluid channel 22. In other embodiments, an aperture layer 14 with light transmissive regions 14(a) may cover the light detecting elements 11(a).

The throughput rate of the OFM device 100 with the hydrodynamic focusing unit 540 is determined by the flow rate of the first focusing unit 542 and second focusing unit 544, the differential pressure before the first focusing unit 542 and second focusing unit 544 and the injection unit 541, and the viscosity of the specimen suspension. In some embodiments, the throughput rate may range from 500-1000 objects per minute.

E. Dielectrophoresis (DEP) Flow to Keep Objects Proximal to Surface

In some embodiments, the resolution of the images being imaged by the OFM device 100 can be improved and potentially maximized by ensuring that the object 10 translates in a plane just above the first surface 22(a) above the aperture layer 14 having light transmissive regions 14(a).

In one embodiment, the object 10 may be physically confined to this plane above the first surface 22(a) due to the geometry of the fluid channel 22. To confine the object 10 to the plane requires that the size of the fluid channel 22 be on the order of the object 10 being imaged, which for smaller objects (<0.5 micron) may mean a channel size on the order of hundreds of nanometers. In addition, physical confinement using the geometry of the fluid channel 22 may not be effective for specimens with objects 10 of very different sizes.

Dielectrophoresis is a phenomenon in which a force is exerted on an object when it is subjected to a non-uniform electric field. The dielectrophoretic force can cause the object 10 to move either up or down the non-uniform electric field. This force does not require that the object 10 be charged. However, the strength of the force will depend on the electrical charge of the object 10. The strength of the force will also depend on the object's shape and size, as well as on the frequency of the electric field. Using electric fields of particular frequencies, objects 10 can be selectively manipulated based on their charge and geometry.

Figure 20:
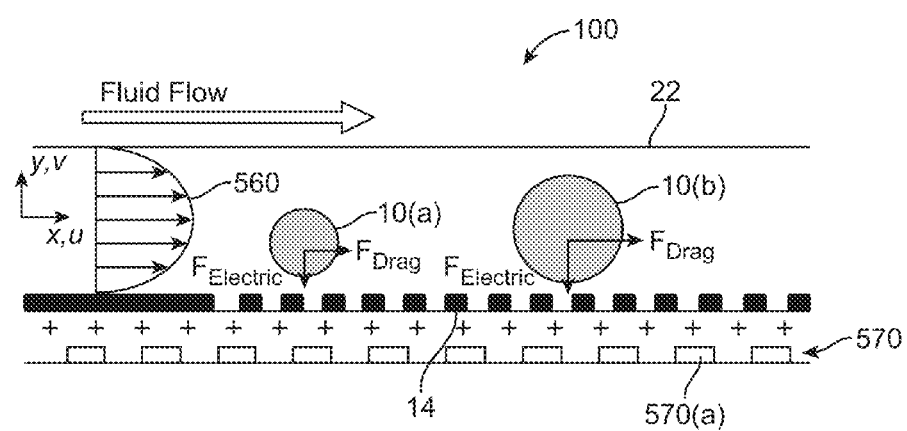
FIG. 20 is a schematic drawing of a side view of components of an OFM device subjected to a non-uniform electric field, according to an embodiment of the invention.

FIG. 20 is a schematic drawing of a side view of components of an OFM device 100 subjected to a non-uniform electric field, according to an embodiment of the invention. The OFM device 100 has a fluid channel 22 having an x, u-axis and a y, v-axis. The fluid channel 22 is subjected to an uneven velocity distribution represented by the parabolic velocity profile 560. The fluid channel 22 includes aperture layer 14 having light transmissive regions 14(a). The fluid channel 22 also has an electrode layer 570 with electrodes 570(a) that create a non-uniform electric field. An object 10(a) and 10(b) are in the fluid channel 22. The object 10(a) is of a larger size than the object 10(b). Since the sizes are different, the forces from the non-uniform electric field and/or from the uneven velocity distribution are different. The $F_{electric}$ and $F_{drag}$ forces on the smaller object 10(a) are smaller in comparison to the $F_{electric}$ and $F_{drag}$ forces on the larger 10(b).

Many objects 10 such as biological cells have electric charges, either positive or negative. By imposing an opposite charge on the first surface 22(a) of the body 16 having the light transmissive regions 14(a), the objects 10 can be attracted to the first surface 22(a) and can be trapped to translate just above the first surface 22(a). A charge can be imposed using any suitable manner such as by coating a thin layer of charged polymer on the first surface 22(a) or by using an electrode.

F. Optical Tweezers

Optical tweezers can provide a high-precision method for manipulation of the object 10 including controlling the translation and rotation of the object 10. An exemplary OFM device 100 using an optical tweezer can be found in X. Heng, E. Hsiao, D. Psaltis, C. Yang, *An optical tweezer actuated, nanoaperture-grid based Optofluidic Microscope implementation* method, Optics Express 15, 16367 (2007), which is hereby incorporated by reference in its entirety for all purposes.

Figure 21:
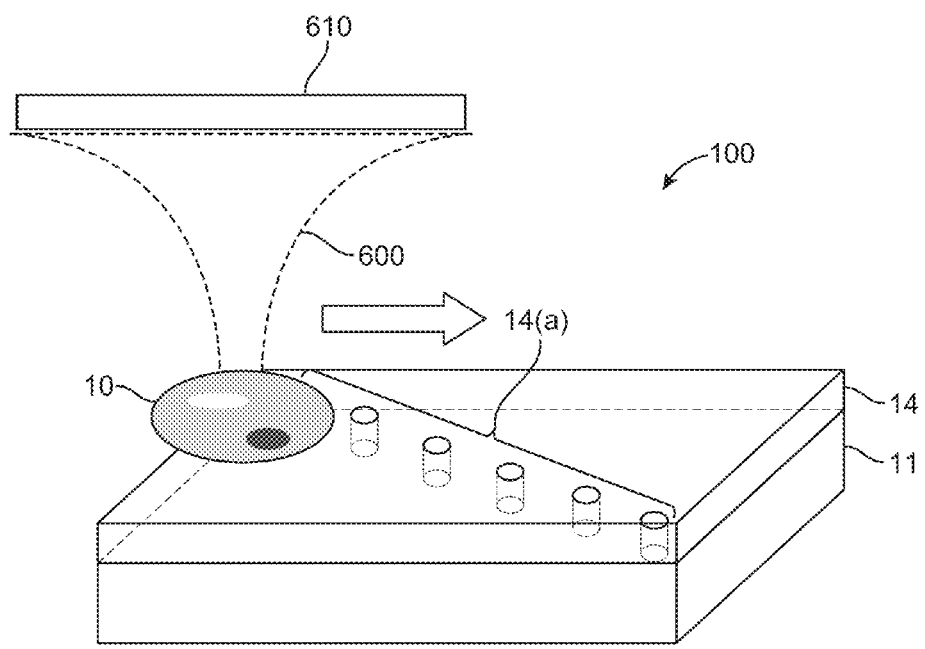
FIG. 21 is a schematic drawing of a perspective view of components of an OFM device employing an optical tweezer to control the movement of the object, according to an embodiment of the invention.

FIG. 21 is a schematic, perspective drawing of components of an OFM device 100 employing an optical tweezer 600 to control the movement of an object 10, according to an embodiment of the invention. The OFM device 100 includes an opaque or semi-opaque aperture layer 14 that has light transmissive regions 14(a). The OFM device 100 also includes a light detector 11 to the outside of the opaque or semi-opaque aperture layer 14. The optical tweezer 600 uses a laser 610 to generate a focused laser beam which attracts the object 10 as outlined in X. Heng, E. Hsiao, D. Psaltis, C. Yang, *An optical tweezer actuated, nanoaperture-grid based Optofluidic Microscope implementation method*, Optics Express 15, 16367 (2007), which is hereby incorporated by reference in its entirety for all purposes. By moving the focused laser beam, the object 10 can be moved across the light transmissive regions 14(a). While the object 10 is being translated by the optical tweezer 600, the object 10 does not rotate. The optical tweezer 600 provides the ability to control the translational and rotational movement of the object 10. By controlling the movement of the focused laser beam, the speed of the object 10 can also be controlled.

VI. Adjusting the Focal Plane of the OFM Image

In some embodiments, image quality can be improved by computationally adjusting the focal plane of the image wavefront of the object to focus the image. This technique uses an OFM device configured to use differential interference contrast (DIC) based on Young's interference to measure both the quantitative amplitude and differential phase in two orthogonal directions of the image wavefront (collectively a DIC OFM device). With the 2D amplitude and phase information, the DIC OFM device has sufficient data about the detected wavefront at the detection plane to numerically reconstruct the detected wavefront. The DIC OFM device can then reconstruct the image wavefront at any desired focal plane by numerically back propagating the detected wavefront from the detection focal plane to the desired focal plane based on electromagnetic wave theory. In this way, the DIC OFM device can adjust the focal plane by numerically back propagating the detected wavefront to retrace an image wavefront at any desired focal plane. The DIC OFM device can focus the image by computationally adjusting the focal plane. One advantage of embodiments using this technique is that the images can be reconstructed at any focal plane which can provide a higher quality image. Another advantage of embodiments using this technique is that the DIC OFM device computationally adjusts the focus of the image without having to physically change the focal length.

The adjustment of the focal plane of an OFM is based on a DIC OFM scheme. An example of a DIC OFM scheme can be found in U.S. patent application Ser. No. 11/743,581 entitled "On-chip Microscope/Beam Profiler based on Differential Interference Contrast and/or Surface Plasmon Assisted Interference" filed on May 2, 2007 and in Cui, Xiquan, Lew, Matthew, Yang, Changhuei, *Quantitative differential interference contrast microscopy based on structured-aperture interference*, Appl. Phys. Lett. 93, 091113 (2008), which are hereby incorporated by reference in their entirety for all purposes. Because both the quantitative amplitude and phase information of an object can be determined with a DIC OFM device, an image of the object can be reconstructed at any plane by back-propagating the wavefront measured by the DIC OFM device.

Figure 22:
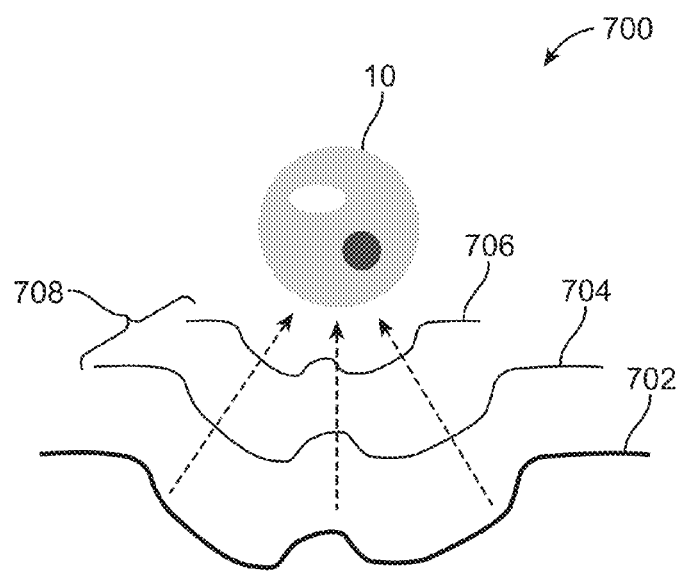
FIG. 22 is a schematic drawing of image wavefronts of an object at three focal planes as measured by a DIC OFM device, according to embodiments of the invention.

FIG. 22 is a schematic drawing of image wavefronts of an object 10 at three focal planes as measured by a DIC OFM device 700, according to embodiments of the invention. The DIC OFM device 700 includes a first (detected) image wavefront 702 of the object 10 measured at a first (detection) focal plane at the surface 11(a) of the light detector 11 shown in FIGS. 23(a) and 23(b). The DIC OFM device 700 also includes a second image wavefront 704 of the object 10 measured at a second focal plane and a third image wavefront 706 of the object 10 measured at a third focal plane. The wavefronts 704 and 706 are retraced image wavefronts 708 generated by back propagating the first (detected) image wavefront 702 to the second and third focal planes respectively. The second and third focal planes can refer to planes parallel to the first (detection) focal plane at surface 11(a). The second focal plane is at a distance $y_1$ from the detection focal plane 11(a) and the third focal plane is located at a distance $y_2$ from the detection focal plane 11(a).

In operation, the light detector 11 can measure the quantitative amplitude and differential phase information in two orthogonal directions of the first (detected) wavefront 702 at the detection plane. The light detector 11 or a host computer 50 (shown in FIG. 3A) connected to the light detector 11 can reconstruct the detected wavefront 702 based on the measured quantitative amplitude and differential phase information. The light detector 11 or the host computer 50 can retrace the wavefront 704 by numerically propagating the detected wavefront 702 back to the second focal plane. The light detector 11 or the host computer 50 can retrace the wavefront 706 by numerically propagating the detected wavefront 702 or the retraced wavefront 704 back to the third focal plane. The DIC OFM device 700 can adjust the focal plane to second, third, or other focal planes to improve the quality of the image of the object 10.

A. Basis in Young's Double Slit Interference

Figure 23A:
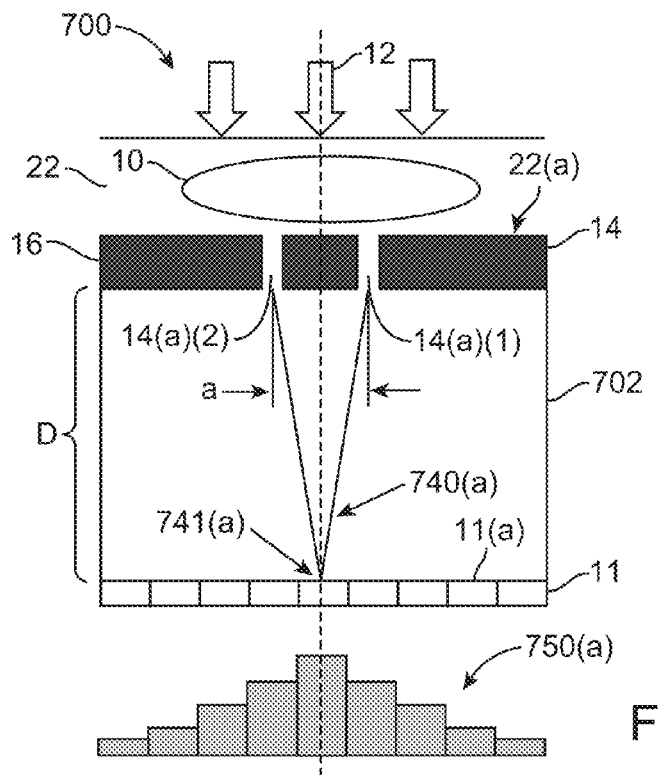
FIG. 23(a) is a schematic drawing of a side view of components of a DIC OFM device using Young's interference, according to an embodiment of the invention.
Figure 23B:
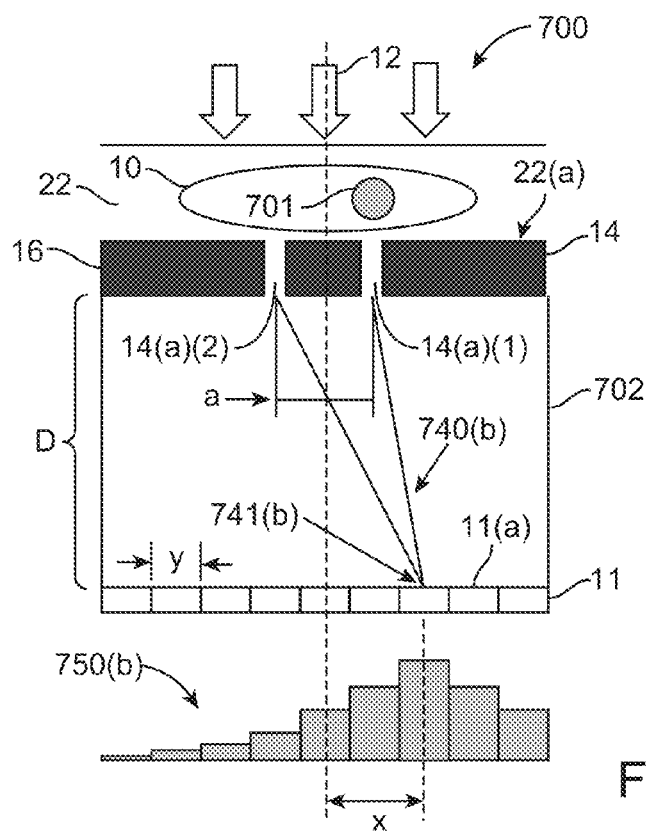
FIG. 23(b) is a schematic drawing of a side view of components of a DIC OFM device using Young's interference, according to an embodiment of the invention.

Young's double slit experiment provides a basis for the technique of adjusting the focal plane in a DIC OFM device 700. FIGS. 23(a) and 23(b) are schematic drawings of a side view of components of a DIC OFM device 700, according to embodiments of the invention. In each illustrated embodiment, the DIC OFM device 700 has a body which defines or includes a fluid channel 22 and an aperture layer 14 (e.g., a metal film). The aperture layer 14 has a first light transmissive region 14(a)(1) and a second light transmissive region 14(a)(2) (double slits). An illumination source 12 provides illumination (light) to an object 10 in the fluid channel 22. The DIC OFM device 700 also includes a light detector 11 (e.g., CCD, CMOS, PSD, etc.) for measuring the light distribution received from the light transmissive regions 14(a)(1) and 14(a)(2). The two light transmissive regions 14(a)(1) and 14(a)(2) are located at a distance D away from the light detector 11 and are separated from each other by a distance, a. The DIC OFM device 700 also includes a transparent layer 702 between the aperture layer 14 and a light detector 11. The transparent layer 702 can include one or more layers of transparent material such as water or a viscous polymer (e.g., SU-8 resin), or can be a vacuum or gas-filled space.

In FIG. 23(a), the object 10 being imaged is homogenous. In FIG. 22(b), the object 10 includes a feature 701 having a refractive index variation from other homogenous portions of the object 10. As an example, the object 10 in FIG. 22(b) could be a cell and the feature 701 may be a nucleus having a different refractive index than other portions of the cell.

In FIGS. 23(a) and 23(b), light transmissive region 14(a)(1) collects a reference beam from the object 10 i.e. light transmitted through the object 10 at light transmissive region 14(a)(1). Light transmissive region 14(a)(2) collects a sample beam i.e. light transmitted through the object 10 at light transmissive region 14(a)(2). If the reference and sample beams pass a homogenous region of the object 10, as is shown in FIG. 23(a), the beams carry the same phase. When beams with the same phase exit the two light transmissive regions 14(a)(1) and 14(a)(2), the light intensity distribution 750(a) of their Young's interference 740(a) is centered on the light detector 11. If the reference beam and the sample beam pass a non-homogenous feature 701, as shown in FIG. 23(b), the beams carry different phases. In this case when the beams exit the two light transmissive regions 14(a)(1) and 14(a)(2), the light intensity distribution 750(b) of their Young's interference 740(b) will be shifted on the light detector 11 by an offset, x. The offset, x is directly related to the phase difference between the reference and sample beams. By calculating the centroid 741 of the interference pattern, the quantitative differential phase information of the object 10 can be determined Based on Young's interference, the phase difference, $\Delta\phi$ is defined by the Eq. (5), $$\Delta\phi \approx \frac{2\pi}{\lambda} \frac{a}{D} \quad (5)$$

In addition, the amplitude of the light transmitted through the object 10 at that location can be computed by simply summing up all of the signals from the light detector 11.

B. DIC OFM with 2D Arrangements of Light Transmissive Regions

Embodiments of DIC OFM devices generalize the Young's double slit experiment into the two dimensional case. Some embodiments of DIC OFM devices employ a 2D arrangement of light transmissive regions extending in two orthogonal directions. By employing a 2D arrangement, these DIC OFM devices can determine the amplitude and differential phase information in two orthogonal directions based on Young's double slit experiment. A 2D arrangement can refer to light transmissive regions 14(a) arranged in orthogonal directions x and y in the aperture layer 14. For example, four light transmissive regions (holes) arranged in a 'plus' sign configuration can give a measure of the differential phase in both orthogonal directions x and y. An example of a device that uses a four hole aperture arrangement for differential phase imaging can be found in Lew, Matthew, Cui, Xiquan, Heng, Xin, Yang, Changhuei, *Interference of a four-hole aperture for on-chip quantitative two-dimensional differential phase imaging*, Optic Letters, Vol. 32, No. 20, 2963 (2007), which is hereby incorporated by reference in its entirety for all purposes. Some examples of 2D arrangements include the noted 'plus' sign configuration of four light transmissive regions 14(a), a single pedal-shaped aperture, a ring or Fresnel zone plate, and other suitable arrangements of light transmissive regions 14(a) in orthogonal directions.

Figure 24:
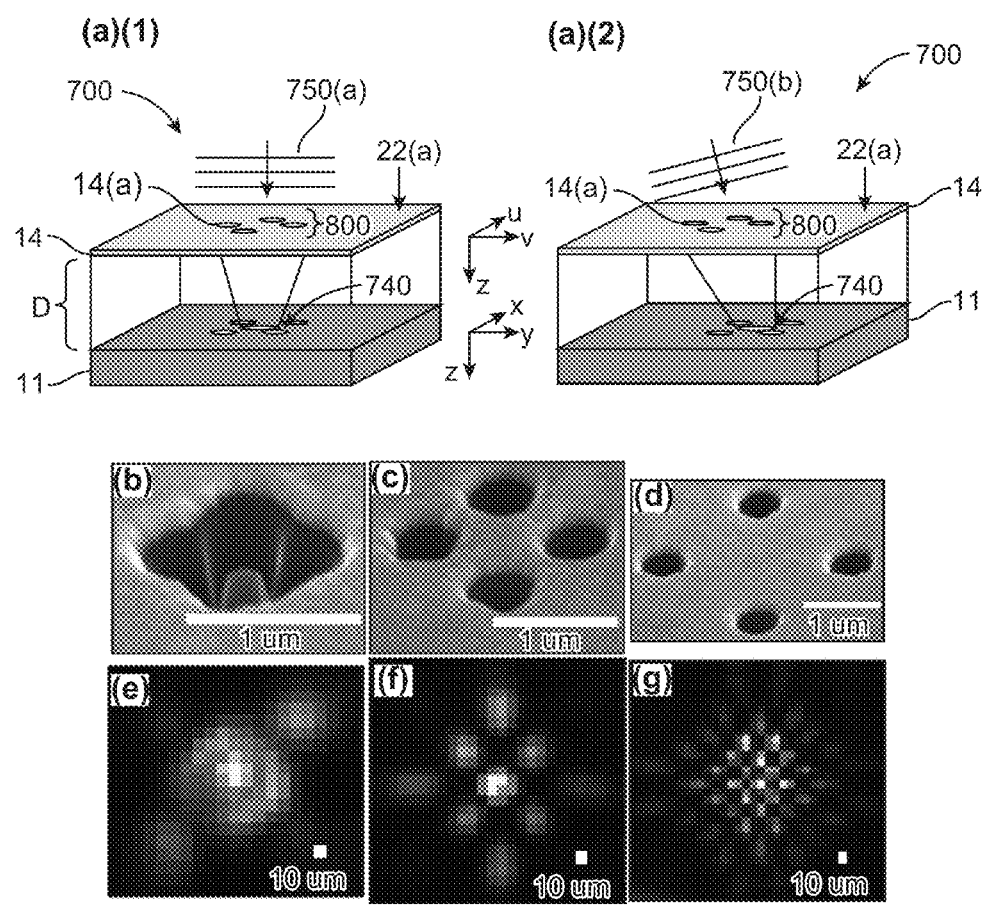
FIG. 24(a)(1) is a schematic drawing of a perspective view of a 'plus' sign arrangement of four light transmissive regions, according to an embodiment of the invention.
FIGS. 24(b), 24(c), and 24(d) are images taken by a scanning electron microscope of 2D arrangements of light transmissive regions, according to embodiments of the invention.
FIGS. 24(e), 24(f), and 24(g) are images of the resulting interference patterns of the 2D arrangements respectively from FIGS. 24(b), 24(c), and 24(d), according to embodiments of the invention.

FIGS. 24(a)(1) and 24(a)(2) are schematic drawings of a perspective view of a 'plus' sign arrangement 800 of four light transmissive regions 14(a), according to embodiments of the invention. The 'plus' sign arrangement 800 can measure the differential phase in orthogonal directions x and y. In the illustrated embodiments, the DIC OFM device 700 has an aperture layer 14 with a 'plus' sign arrangement 800. The DIC OFM device 700 also has a light detector 11 (e.g., a CMOS image sensor) located at a distance, D from the aperture layer 14 (e.g., Ag film). The DIC OFM device 700 also includes a transparent layer 702 between the aperture layer 14 and a light detector 11. The transparent layer 702 can be one or more layers of transparent material such as water or a viscous polymer (e.g., SU-8 resin) or can be a vacuum or gas-filled space. Any suitable spacing between the light transmissive regions 14(a) in the 'plus' sign arrangement 800 can be used. Some examples of suitable spacing are 1 µm, 2 µm, or 3 µm.

In FIGS. 24(a)(1) and 24(a)(2), the light passing through the light transmissive regions in the 'plus' sign arrangement 800 is received by the light detector 11. In FIG. 23(a)(1), the light field 750(a) is projected orthogonal to the first surface 22(a). In FIG. 24(a)(2), the light field 750(b) is projected at an angle with respect to the first surface 22(a). The light projected at different angles in FIG. 24(a)(1) and FIG. 24(a)(2) results in different projections on the light detector 11.

FIGS. 24(b), 24(c), and 24(d) are images taken by a scanning electron microscope of 2D arrangements of light transmissive regions 14(a), according to embodiments of the invention. FIG. 24(b) illustrates a pedal-shaped aperture arrangement. FIG. 24(c) and FIG. 24(d) illustrate 'plus' sign arrangements 800. The spacing between the light transmissive regions in the 'plus' sign arrangement of FIG. 24(c) is shorter than the spacing between the light transmissive regions in the arrangement shown in FIG. 24(d). FIGS. 24(e), 24(f), and 24(g) are images of the resulting interference patterns of the 2D arrangements respectively from FIGS. 24(b), 24(c), and 24(d), according to embodiments of the invention.

The above compact and lensless 2D differential phase measurement scheme can be deployed in OFM imaging scheme as well. By replacing the single light transmissive regions 14(a) in the intensity OFM device 100 of FIG. 24(a) with 2-D arrangements, the intensity OFM device 100 becomes an on-chip and quantitative differential interference contrast optofluidic microscope (DIC OFM 700) which can improve image quality while providing high throughput in a compact and inexpensive device (DIC OFM 700).

Figure 25A:
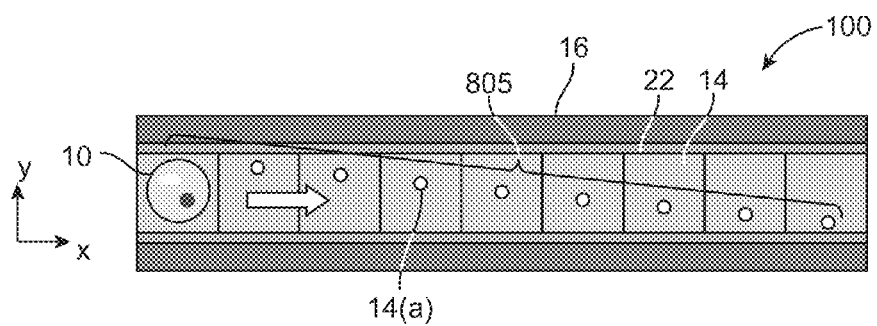
FIG. 25(a) is a schematic drawing of a top view of components of an intensity OFM device including light transmissive regions in the form of a one-dimensional array, according to an embodiment of the invention.

FIG. 25(a) is a schematic drawing of a top view of components of an intensity OFM device 100 including light transmissive regions 14(a) in the form of a one-dimensional array 805 of single light transmissive regions 14(a), according to an embodiment of the invention. The intensity OFM device 100 also includes a body 16 forming or including a fluid channel 22. The light transmissive regions 14(a) are located in the aperture layer 14 of the body 16. The intensity OFM device 100 also includes a light detector 11 (shown in FIG. 3(a)) having elements for taking time varying readings of the light received through the light transmissive regions 14(a) as the object travels through the fluid channel 22. The OFM device 100 can use the time varying readings to reconstruct an image of the object 10 based on light intensity.

Figure 25B:
FIG. 25(b) is a schematic drawing of a top view of components of a DIC OFM device including a one-dimensional array of 'plus' sign arrangements of light transmissive regions, according to an embodiment of the invention.
Figure 25B:
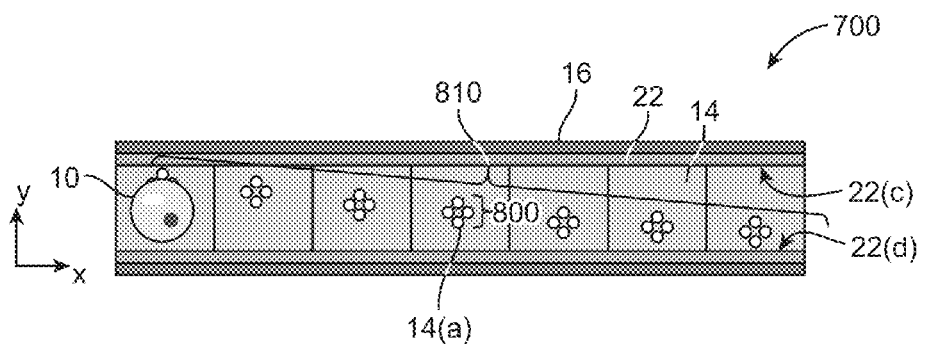

FIG. 25(b) is a schematic drawing of a top view of components of a DIC OFM device 700 including a one-dimensional array 805 of 'plus' sign arrangements 800 of light transmissive regions 14(a), according to an embodiment of the invention. The one-dimensional array extends from one lateral surface 22(c) to another lateral surface 22(d) of the fluid channel 22. The one-dimensional array is located at an angle, θ with respect to the x-axis. The angle, θ can be any suitable angle. Although the illustrated embodiment uses a one dimensional array, any suitable formation of 2D arrangements can be used such as a slit, a two-dimensional array, or a multiplicity of one-dimensional and/or two-dimensional arrays. In addition, the formations can have any suitable orientation or combination of orientations. Although the illustrated embodiment uses a 'plus' sign configuration of light transmissive regions 14(a), other suitable types of arrangement of light transmissive region(s) in orthogonal directions x and y can be used such as a single pedal-shaped aperture or ring or Fresnel zone plate.

The DIC OFM device 700 also includes a body 16 forming or including a fluid channel 22. The light transmissive regions 14(a) are located in the aperture layer 14 of the body 16. The DIC OFM device 700 also includes a light detector 11 having elements (e.g., pixels) for taking time varying readings of the light it receives from the light transmissive regions 14(a) as the object 10 moves through the fluid channel 22.

In operation, the light detector 11 takes time varying readings of the light it receives from the light transmissive regions 14(a) as the object 10 moves through the fluid channel 22. The DIC OFM device 700 uses the time varying readings to determine a light intensity distribution generated by 'plus' sign configurations of light transmissive regions 14(a). The DIC OFM device 700 uses the light intensity distribution to determine the interference in orthogonal directions x and y and then determines the differential phase in orthogonal directions x and y based on the determined interference. The DIC OFM device 700 also determines the amplitude by summing the intensity of the light detected over an area of the light detector 11 mapping to a particular set of light transmissive regions 800. The DIC OFM device 700 uses the amplitude and differential phase information in the orthogonal directions x and y to determine the image based on the detection focal plane at the surface 22(a) of the fluid channel 22. The DIC OFM device 700 can adjust the image to a new focal plane by back propagating the image from the detection focal plane to the new focal plane.

Figure 26:
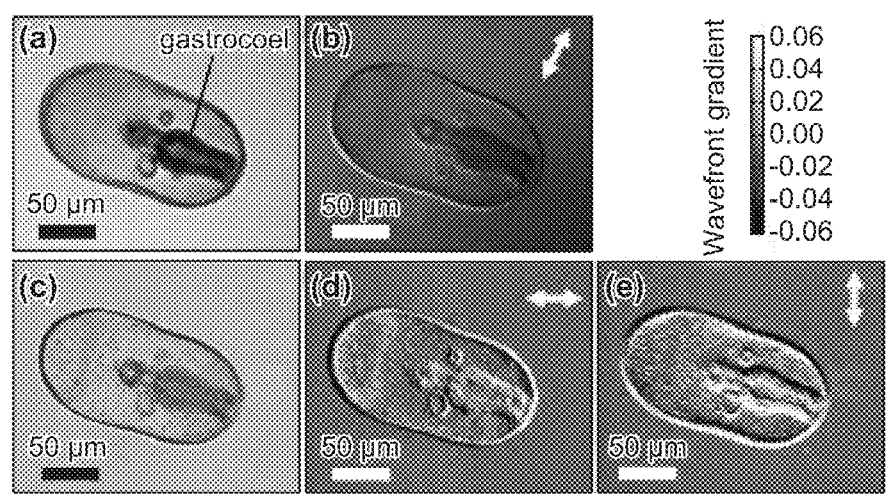
FIG. 26(a) is an image taken of a starfish embryo using a conventional transmission microscope.
FIG. 26(b) is an image taken of a starfish embryo using a conventional DIC microscope.
FIG. 26(c) is an image taken of a starfish embryo using an intensity microscope, according to an embodiment of the invention.
FIG. 26(d) is an image taken of a starfish embryo using a quantitative DIC microscope based on a structured aperture (SA) wavefront sensor microscope (SA-DIC microscope) using the phase shift information in the x-direction, according to an embodiment of the invention.
FIG. 26(e) is an image taken of a starfish embryo using a SA-DIC microscope using the phase shift in the y-direction, according to an embodiment of the invention.

Examples of methods of measuring the amplitude and differential phase in two orthogonal directions of the sample wavefront quantitatively can be found in Cui, Xiquan, Lew, Matthew, Yang, Changhuei, *Quantitative differential interference contrast microscopy based on structured-aperture interference*, Appl. Phys. Lett. 93, 091113 (2008), which are hereby incorporated by reference in their entirety for all purposes. FIG. 26(a) is an image taken of a starfish embryo using a conventional transmission microscope. FIG. 26(b) is an image taken of a starfish embryo using a conventional DIC microscope. FIG. 26(c) is an image taken of a starfish embryo using an intensity microscope, according to an embodiment of the invention. FIG. 26(d) is an image taken of a starfish embryo using a quantitative DIC microscope based on a structured aperture (SA) wavefront sensor microscope (SA-DIC microscope) using the phase shift information in the x-direction, according to an embodiment of the invention. FIG. 26(e) is an image taken of a starfish embryo using a SA-DIC microscope using the phase shift in the y-direction, according to an embodiment of the invention.

The amplitude and differential phase in two orthogonal directions of the sample wavefront quantitatively gives the complete knowledge of the sample wavefront at the detection plane. Based on the electromagnetic wave theory, propagating the wavefront back numerically and calculating the wavefront above the detection plane is possible, and the focal plane of the OFM imaging can be computationally adjusted.

In some embodiments, the DIC OFM device 700 may include one or more components of embodiments of the OFM device 700. Some embodiments of the DIC OFM device 700 include a processor (e.g., a microprocessor) coupled to a computer readable medium (CRM), and other suitable devices. Alternatively or additionally, the DIC OFM device 700 may be communicatively coupled to a computer having a processor coupled to a CRM. The computer may process data communicated from the DIC OFM device 700.

The processor may be integrated or separate from the light detector 11. The processor receives signals with time varying data from the light detecting elements 11(*a*) of the light detector 11 associated with the light received by the light detecting elements 11(*a*). The data may include the intensity of the light, the wavelength(s) of the light, the Young's interference in one or more directions, and/or other information about the light received by the light detecting elements 11(*a*). The processor executes code for performing some of the functions of the DIC OFM device 700.

The CRM (e.g., memory) stores the code for performing the functions of the DIC OFM device 700. The code is executable by the processor. In one embodiment, the CRM comprises a) code for determining the light distribution from the time varying data received from the light detecting elements 11(*a*), b) code for measuring the quantitative amplitude and differential phase in one or two orthogonal directions of the image wavefront; c) code for reconstructing the detected wavefront from the quantitative amplitude and differential phase in two orthogonal directions; d) code for adjusting the focal plane by numerically back propagating the detected wavefront at the detected focal plane to retrace a new wavefront at a new focal plane; e) code for computationally adjusting the focus of the image of an object by adjusting the focal plane; and f) any other suitable code for adjusting the focal plane and image processing. The CRM may also include code for performing any of the signal processing or other software-related functions that may be created by those of ordinary skill in the art. The code may be in any suitable programming language including C, C++, Pascal, etc.

The processing components may also include a display communicatively coupled to the processor. Any suitable display may be used. In one embodiment, the display may be a part of the DIC OFM device 700. The display may provide information such as the image of the object 10 to a user of the OFM device 700.

It should be understood that the present invention as described above can be implemented in the form of control logic using computer software in a modular or integrated manner. Other ways and/or methods to implement the present invention using hardware and a combination of hardware and software may also be used.

Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

A recitation of "a", "an" or "the" is intended to mean "one or more" unless specifically indicated to the contrary.

The above description is illustrative and is not restrictive. Many variations of the disclosure will become apparent to those skilled in the art upon review of the disclosure. The scope of the disclosure should, therefore, be determined not with reference to the above description, but instead should be determined with reference to the pending claims along with their full scope or equivalents.

One or more features from any embodiment may be combined with one or more features of any other embodiment without departing from the scope of the disclosure. Further, modifications, additions, or omissions may be made to any embodiment without departing from the scope of the disclosure. The components of any embodiment may be integrated or separated according to particular needs without departing from the scope of the disclosure.

What is claimed is:

1. A differential interference contrast optofluidic microscope (DIC OFM) device comprising:
    a body defining a fluid channel having a longitudinal axis, the body including a surface layer proximal to the fluid channel;
    light transmissive regions in the surface layer;
    a light detector in the body, the light detector determining at a first focal plane an image wavefront of an object based on light received from the light transmissive regions as the object passes through the fluid channel; and
    an image processor back propagating the image wavefront from the first focal plane to a second focal plane.

2. The DIC OFM device of claim 1, wherein the body includes a transparent layer between the light transmissive regions and the light detector.

3. The DIC OFM device of claim 1, wherein the light detector determines the image wavefront using differential phase information based on an interference pattern associated with the light transmissive regions.

4. The DIC OFM device of claim 1, wherein the light transmissive regions form a two dimensional arrangement of light transmissive regions in two orthogonal directions.

5. The DIC OFM device of claim 4, wherein the two dimensional arrangement is a 'plus' sign configuration of light transmissive regions.

6. The DIC OFM device of claim 4, wherein the two dimensional arrangement is a pedal-shaped aperture of light transmissive regions.

7. The DIC OFM device of claim 4, wherein the light detector determines the image wavefront using differential phase information in the two orthogonal directions based on an interference pattern associated with the two dimensional arrangement of light transmissive regions.

8. The DIC OFM device of claim 1, wherein the light transmissive regions form an array of two dimensional arrangements of light transmissive regions in two orthogonal directions.

9. The DIC OFM device of claim 8, wherein the array substantially extends across a width of the surface layer.

10. The DIC OFM device of claim 8, wherein the array is located at an angle with respect to the longitudinal axis of the fluid channel.

11. The DIC OFM device of claim 1, wherein the light detector includes the image processor.

12. The DIC OFM device of claim 1, wherein the light detector generates time varying data associated with the received light and determines the image wavefront using the generated time varying data.

13. The DIC OFM device of claim 1, wherein the second focal plane is located between the first focal plane and the object.

14. A method of adjusting a first focal plane of an image wavefront to a second focal plane using a DIC OFM having a body defining a fluid channel and including a surface layer proximal the fluid channel, having light transmission regions in the surface layer, having a light detector, and having an image processor, the method comprising:
    providing light from an illumination source to the fluid channel;

detecting light, by the light detector, from the light transmissive regions as an object moves through the fluid channel;

constructing the image wavefront of the object at the first focal plane using differential phase information associated with light received from the light transmissive regions; and adjusting the first focal plane using the image processor by back propagating the image wavefront from the first focal plane to the second focal plane.

15. The method of claim 14, further comprising:
determining an interference pattern associated with the light received from the light transmissive regions; and
measuring the differential phase information in two orthogonal directions based on the interference pattern.

16. The method of claim 14, further comprising focusing an image of the object by adjusting the first focal plane to the second focal plane of the image wavefront.

17. The method of claim 14, wherein the light transmissive regions form an array of two dimensional arrangements of light transmissive regions in two orthogonal directions.

* * * * *